(12) United States Patent
Oonishi et al.

(10) Patent No.: US 12,299,034 B2
(45) Date of Patent: *May 13, 2025

(54) AUTOMATIC VIDEO PRODUCTION DEVICE, AUTOMATIC VIDEO PRODUCTION METHOD, AND VIDEO RECORDING MEDIUM USED THEREFOR

(71) Applicant: Maxell, Ltd., Kyoto (JP)

(72) Inventors: Kunikazu Oonishi, Tokyo (JP); Seiji Murata, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,409

(22) Filed: Oct. 31, 2023

(65) Prior Publication Data
US 2024/0061882 A1     Feb. 22, 2024

Related U.S. Application Data

(63) Continuation of application No. 17/262,224, filed as application No. PCT/JP2018/027871 on Jul. 25, 2018, now Pat. No. 11,841,901.

(51) Int. Cl.
*G06F 16/783*     (2019.01)
*G06F 16/78*     (2019.01)
(Continued)

(52) U.S. Cl.
CPC ........ *G06F 16/784* (2019.01); *G06F 16/7867* (2019.01); *G06F 18/251* (2023.01);
(Continued)

(58) Field of Classification Search
None
See application file for complete search history.

(56) References Cited

U.S. PATENT DOCUMENTS

| 2008/0043644 A1* | 2/2008 | Barkley ................. H04Q 11/00 370/263 |
| 2014/0225985 A1* | 8/2014 | Klusza ................. H04N 13/271 348/46 |

(Continued)

FOREIGN PATENT DOCUMENTS

| JP | 2010-232813 A | 10/2010 |
| JP | 2015-038696 A | 2/2015 |

(Continued)

OTHER PUBLICATIONS

International Search Report and Written Opinion mailed on Sep. 18, 2018, received for PCT Application PCT/JP2018/027871, Filed on Jul. 25, 2018, 9 pages.

(Continued)

*Primary Examiner* — Delomia L Gilliard
(74) *Attorney, Agent, or Firm* — XSENSUS LLP

(57) ABSTRACT

An automatic video production device that performs fitting or fusion processing of a predetermined child video object that is not included in a parent video into a predetermined video scene of the parent video content as a video fusion source, the automatic video production device including a video content interpreting unit that interprets the entirety or a part of the video content of the parent video content, or divides the parent video content into a predetermined parent video scene to generate processing data that is predetermined parent video interpretation data obtained by converting a content interpretation result of the parent video or a division result of the parent video scene into data in a predetermined description format.

18 Claims, 16 Drawing Sheets

(51) Int. Cl.
  *G06F 18/25* (2023.01)
  *G06T 7/70* (2017.01)
  *G06V 20/40* (2022.01)
  *G06V 40/16* (2022.01)
  *G06V 40/20* (2022.01)
(52) U.S. Cl.
  CPC ............... *G06T 7/70* (2017.01); *G06V 20/41* (2022.01); *G06V 20/46* (2022.01); *G06V 40/176* (2022.01); *G06V 40/20* (2022.01)

(56) References Cited

U.S. PATENT DOCUMENTS

| | | | | |
|---|---|---|---|---|
| 2014/0245367 | A1* | 8/2014 | Sasaki | H04N 21/2343 725/109 |
| 2015/0046537 | A1* | 2/2015 | Rakib | G11B 27/34 709/204 |
| 2015/0304667 | A1* | 10/2015 | Suehring | H04N 19/12 375/240.02 |
| 2016/0088340 | A1 | 3/2016 | Yabu | |
| 2017/0187956 | A1* | 6/2017 | Fink | H04N 23/55 |
| 2017/0244956 | A1* | 8/2017 | Stiglic | H04N 7/181 |
| 2023/0133579 | A1* | 5/2023 | Chang | G06F 3/013 382/103 |

FOREIGN PATENT DOCUMENTS

| | | |
|---|---|---|
| JP | 7252236 B2 | 4/2023 |
| WO | 2015/015712 A1 | 2/2015 |

OTHER PUBLICATIONS

Office Action issued May 7, 2024 in Japanese Patent Application No. 2023-047096 with machine English translation.

* cited by examiner

FIG. 3

| ITEM | | ITEM EXAMPLE OF DATA OR PARAMETER |
|---|---|---|
| OBJECT NAME | | ○×△ (NAME OR IDENTIFIER CAPABLE OF BEING INDIVIDUALLY IDENTIFIED) |
| | PHYSICAL ATTRIBUTES | · PERSON, ANIMAL, PLANT, AND THE LIKE<br>· FOODS, BEVERAGES (GRAINS, MEAT, FRUIT, DRINKING WATER, AND THE LIKE)<br>· GENERAL PERSONAL BELONGINGS (CLOTH, WATCH, NOTE, PEN, AND THE LIKE)<br>· HOUSEHOLD FURNITURE AND APPLIANCES (TABLE, SOFA, BED, REFRIGERATOR, AND THE LIKE)<br>· MOVABLE OBJECTS (BICYCLE, AUTOMOBILE, SHIP, AIRPLANE, AND THE LIKE)<br>· INFRASTRUCTURE (ROAD, BRIDGE, PIPELINE, ARCHITECTURE, AND THE LIKE)<br>· NATURAL LANDSCAPE (MOUNTAIN, RIVER, GRASS LAND, GROVE, FOREST, SEA, LAKE, AND THE LIKE)<br>· MATERIAL, RAW MATERIAL, COMPONENT<br>· OTHERS |
| | SOCIAL ATTRIBUTE | · AGE, DISTINCTION OF SEX, JOB, CAREER, ROLE IN CONTENT, AND THE LIKE<br>· IMPORTANCE, PRIORITY, AND THE LIKE IN SCENE |
| | VISIBLE STATE | VISIBLE STATE SUCH AS SHAPE, DIMENSION, AND COLOR |
| | INVISIBLE STATE | INVISIBLE STATE SUCH AS WEIGHT (LIGHT, HEAVY), TEMPERATURE (HOT, COLD), TOUCH, SMELL AND ODOR, AND TASTE (SWEET, SPICY), SENSE |
| | CORRELATION | · HUMAN RELATIONSHIP SUCH AS BLOOD RELATION, REGIONAL RELATION, AND FRIENDSHIP, SOCIAL SOLIDARITY<br>· CONNECTION RELATIONSHIP BETWEEN PHYSICAL OBJECTS (SUCH AS PIPELINES, WIRINGS, AND ROADS)<br>· RELATIONSHIP BETWEEN OBJECTS HAVING CORRELATION |
| OBJECT NAME | | □◎▽ |
| | PHYSICAL ATTRIBUTE | ......... ......... ......... ......... ......... ......... |
| | SOCIAL ATTRIBUTE | ......... ......... ......... ......... ......... ......... |

FIG. 4

| ITEM EXAMPLE OF DATA OR PARAMETER |
|---|

| SCENE NUMBER (1) |
|---|

| OBJECT (1) [OBJECT NAME] |
|---|

| TIME TABLE | · THREE-DIMENSIONAL POSITION IN SCENE<br>· DIRECTION, POSTURE, AND THE LIKE OF OBJECT<br>· MOVEMENT DIRECTION, DISTANCE, SPEED, AND THE LIKE<br>· DIALOGUE, FACIAL EXPRESSION, GESTURE, BEHAVIOR, AND THE LIKE<br>· RESTRICTION ON RESPECTIVE PARAMETERS |
|---|---|

| OBJECT (2) [OBJECT NAME] |
|---|

| · THREE-DIMENSIONAL POSITION IN SCENE<br>· DIRECTION, POSTURE, AND THE LIKE OF OBJECT |
|---|

| OBJECT (n) [OBJECT NAME] |
|---|

| TIME TABLE | · THREE-DIMENSIONAL POSITION IN SCENE<br>· DIRECTION, POSTURE, AND THE LIKE OF OBJECT<br>· MOVEMENT DIRECTION, DISTANCE, SPEED, AND THE LIKE<br>· DIALOGUE, FACIAL EXPRESSION, GESTURE, BEHAVIOR, AND THE LIKE<br>· RESTRICTION ON RESPECTIVE PARAMETERS |
|---|---|

| RESTRICTION ON ALL TARGET SCENES<br>(RESTRICTION ON VIDEO FUSION PERMITTED AREA, AND THE LIKE) |
|---|

| SCENE NUMBER (2) |
|---|

| OBJECT (1) [OBJECT NAME] |
|---|

| · THREE-DIMENSIONAL POSITION IN SCENE |
|---|

FIG. 7

| PROCESSING STEP | PROCESSING CONTENT | SPECIFIC PROCESSING EXAMPLE |
|---|---|---|
| S121 | READ CAST AND SCENARIO INCORPORATED PARENT VIDEO CONTENT DATA | READ LIVE CONCERT VIDEO DATA OF IDOL (A) AS PARENT (FUSION SOURCE) VIDEO CONTENT IN RESPONSE TO VIEWER REQUEST |
| S122 | ACQUIRE DETECTED VIEWER BIOMETRIC DATA, DETECTED GESTURE AND BEHAVIOR DATA, AND PERIPHERAL ENVIRONMENT DATA | · ACQUIRE VIEWER BIOMETRIC SITUATION (PULSE, RESPIRATION, BLOOD PRESSURE, PERSPIRATION) DATA<br>· DETECT VIEWER GAZING TARGET (= INTEREST TARGET) BY LINE-OF-SIGHT MONITOR<br>· ACQUIRE VIEWER PERIPHERAL ENVIRONMENT STATE (TEMPERATURE, HUMIDITY) DATA |
| S123 | ESTIMATE VIEWER SITUATION | ESTIMATE THAT VIEWER IS THIRSTY AND WANTS SOFT DRINK ⇒ DETERMINE THAT HIGH APPEALING EFFECT EXISTS IN SOFT DRINK CM |
| S124 | SELECT CHILD VIDEO OBJECT, AND READ VIDEO DATA | SELECT SOFT DRINK BOTTLE (C) MANUFACTURED BY COMPANY (B) (CM SPONSOR) AS CHILD (FUSION TARGET) VIDEO OBJECT, AND READ VIDEO OBJECT DATA  |
| S125 | SELECT VIDEO SCENE ON PARENT CONTENT SIDE INTO WHICH CHILD VIDEO OBJECT IS TO BE FUSED | SELECT DANCING SCENE OF MAIN CHARACTER IDOL (A) IN PARENT CONTENT (LIVE VIDEO)  |
| S126 | DESIGNATE FITTING AND FUSION POSITION OF CHILD VIDEO OBJECT IN SELECTED TARGET SCENE | SELECT RIGHT HAND PORTION OF (A) IN DANCING AS FITTING AND FUSION POSITION OF CHILD VIDEO OBJECT (PET BOTTLE (C))  |
| S127 | CONSTRUCT VIDEO PROCESSING AND PRODUCING SCHEME FOR CHILD VIDEO OBJECT FUSION | CONSTRUCT VIDEO PROCESSING AND EDITING SCHEME FOR PROCESSING INTO "VIDEO IN WHICH (A) IS DANCING WHILE HOLDING PET BOTTLE (C) WITH RIGHT HAND"  |
| S129 | EXECUTE VIDEO PROCESSING, EDITING, AND RENDERING PROCESSING BASED ON VIDEO PROCESSING AND EDITING SCHEME | SPECIFIC PROCESSING CONTENT<br>· MATCH SUPERIMPOSITION BETWEEN RESPECTIVE FINGERS OF RIGHT HAND OF (A) AND PET BOTTLE<br>· CORRECT VIDEO OF RIGHT HAND FINGERS OF (A) INTO FINGERS HOLDING PET BOTTLE<br>· ADJUST IRRADIATION STATE OF ILLUMINATION LIGHT EMITTED TO PET BOTTLE<br>· ADD SHADOW CREATED BY PET BOTTLE AND CHANGE FINGER SHADOW |
| S133 | DISTRIBUTE AND BROADCAST PARENT VIDEO CONTENT INTO WHICH CHILD VIDEO OBJECT IS FUSED | DISTRIBUTE AND BROADCAST LIVE CONCERT VIDEO INTO WHICH CHILD VIDEO OBJECT (PET BOTTLE (C)) IS INCORPORATED |

AUTOMATIC VIDEO PRODUCTION DEVICE, AUTOMATIC VIDEO PRODUCTION METHOD, AND VIDEO RECORDING MEDIUM USED THEREFOR

CROSS-REFERENCE TO RELATED APPLICATIONS

The present application is a continuation of U.S. application Ser. No. 17/262,224, filed Jan. 22, 2021, which is based on PCT filing PCT/JP2018/027871, filed Jul. 25, 2018, the entire contents of each are incorporated herein by reference.

TECHNICAL FIELD

The present invention relates to an automatic video production device that performs processing and edition of a video content and an automatic video production method.

BACKGROUND ART

Recently, next generation new videos represented by "Augmented Reality (abbreviated name AR)" and "Mixed Reality (abbreviated name MR)" have attracted attention. In a field of the next generation videos, there is a demand for an advanced video technology of rationally and seamlessly fusing a real space image (a user's real visual recognition video) in the AR and MR and a virtual video (predetermined video object or the like) in real time.

On the other hand, due to appearance of a high-performance information processing device represented by, for example, Artificial intelligence (AI), the information processing device can automatically or autonomously perform video processing work such as video processing and video edition performed by humans in the related art in real, and several technologies for this are disclosed.

As a background art of this technical field, for example, Patent Document 1 is exemplified. Patent Document 1 discloses a video system technology for a moving image sequence composition in which a predetermined information processing device such as a computer provides a series of image capturing instruction commands to an image capturing device in correspondence with a production procedure determined in advance, and automatically edits a moving image captured in accordance with the command group.

CITATION LIST

Patent Document

Patent Document 1: JP 2010-232813 A

SUMMARY OF THE INVENTION

Problems to be Solved by the Invention

Patent Document 1 discloses a technology for performing a video processing and editing work on the basis of a production scheme (a framework indicating production content and procedure) that is determined in advance by a predetermined video processing device. However, there is no disclosure regarding a video technology for automatically and autonomously performing video fusion production expected to have a predetermined appealing effect to a viewer or a user by fitting and fusing a video object without damaging the story, a content image, or the like of a video content of a fusion source.

Particularly, as in the case of the AR or MR described above, one of technical issues in the next generation video field is creation of advanced video fusion production means for rationally and seamlessly fusing a predetermined virtual video into a real space image in real time by setting scenario indefinite real space image as a video fitting or fusion source.

The invention has been made to solve the above-described problem, and an object thereof is to provide an automatic video production device and an automatic video production method for automatically or autonomously performing an advanced video fusion production as described above, and a video recording medium that is used therefore.

Solutions to Problems

The invention has been made in consideration of the background art and the problem, and according to an aspect of the invention, there is provided an automatic video production device that performs fitting or fusion processing of a predetermined child video object that is not included in a parent video into a predetermined video scene of the parent video content as a video fusion source. The automatic video production device includes a video content interpreting unit that interprets the entirety or a part of the video content of the parent video content, or divides the parent video content into a predetermined parent video scene to generate predetermined parent video interpretation data obtained by converting a content interpretation result of the parent video or a division result of the parent video scene into data in a predetermined description format.

Effects of the Invention

According to the invention, advanced video production, processing, and editing for realizing a rational and seamless video fusion can be automatically and autonomously executed.

BRIEF DESCRIPTION OF THE DRAWINGS

FIG. 3 is a schematic view illustrating a content and a data structure of the cast data in Example 1.

FIG. 4 is a schematic view illustrating a content and a data structure of the scenario data in Example 1.

FIG. 7 is a schematic table showing outline of a specific practical case of the video fusion producing, processing, and editing process in Example 1 for each processing step.

MODE FOR CARRYING OUT THE INVENTION

Hereinafter, examples of the invention will be described with reference to the accompanying drawings.

Example 1

Figure 1:
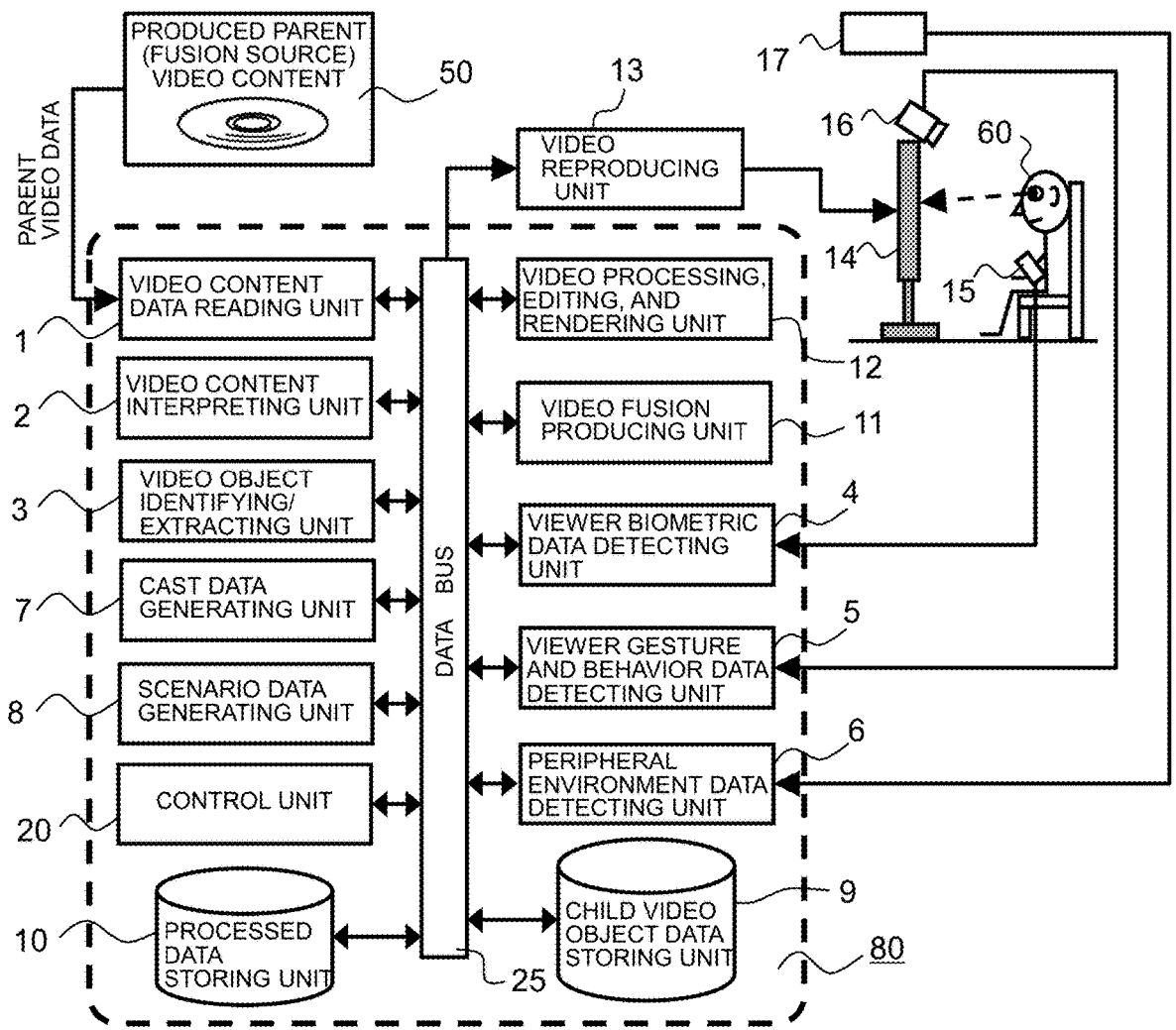
FIG. 1 is a configuration block diagram of an automatic video production device in Example 1.

FIG. 1 is a configuration block diagram of an automatic video production device in this example. In FIG. 1, an automatic video production device 80 surrounded by a broken line includes respective functional units such as a video content data reading unit 1, a video content interpreting unit 2, a video object identifying/extracting unit 3, a viewer biometric data detecting unit 4, a viewer gesture and behavior data detecting unit 5, a peripheral environment data detecting unit 6, a cast data generating unit 7, a scenario data generating unit 8, a child (fusing target) video object data storing unit 9, a processed data storing unit 10, a video fusion producing unit 11, a video processing, editing, and rendering unit 12, and a control unit 20. In addition, as illustrated in the drawing, the respective functional units are connected to a common data bus 25, and can perform exchange of a data signal or a control signal between predetermined functional units through the data bus 25.

Next, specific functions of the respective functional units will be described. Note that, in this example, examples of a content of a video (hereinafter, simply referred to as a parent video) that is a fusion source of video fusion content include produced video contents such as a drama and a recorded artist live video.

The video content data reading unit 1 in the automatic video production device 80 has a function of reading video data of a parent video content 50.

In addition, the video content interpreting unit 2 has a function of interpreting a video content and a scenario from the video data of the parent video content 50 which is obtained from the video content data reading unit 1, and dividing the whole play of the parent video content into predetermined video scenes from the interpretation result.

In addition, the video object identifying/extracting unit 3 has a function of identifying and extracting a part or the entirety of video objects including a person, an object, a background, a landscape, and the like appearing in the parent video content 50 as individual video objects, and applying a predetermined object identifier such as an object name and an ID number for distinguishing the extracted video objects from other video objects to the extracted video objects.

On the other hand, the viewer biometric data detecting unit 4 has a function of detecting and acquiring biometric data such as a respiration rate, a heart rate, a body temperature, a blood pressure, and a perspiration amount of a viewer or user 60 by a predetermined biometric sensor 15.

In addition, the viewer gesture and behavior data detecting unit 5 has a function of detecting and acquiring various kinds of data such as changes in a viewer's line-of-sight direction and facial expression which relate to a gesture or a behavior aspect of the viewer or user 60 by a predetermined visual sensor 16 such as a viewer monitor and a camera.

In addition, the peripheral environment data detecting unit 6 has a function of detecting and acquiring data relating to a peripheral environment state of the viewer or user 60 such as a temperature, humidity, an atmospheric pressure, and illuminance (brightness) by a predetermined environment sensor 17. Note that, the pieces of detected and acquired data are not limited to the above-described data, and an arbitrary data item may be added or selected as necessary. In addition, as a matter of course, with regard to the respective detecting units, it is not necessary for all of the respective detecting units to be mounted in the automatic video production device 80, and an arbitrary detecting unit may be added or selected in correspondence with a necessary data item. As to be described later, in a case where the pieces of detected and acquired data are not necessary, all of the detecting units may not be mounted.

Next, with respect to each video object in the parent video (hereinafter, simply referred to as "parent video object") which is identified and extracted by the video object identifying/extracting unit 3 or a video object (referred to as "child video object") that is an object to be fused to the parent video, the cast data generating unit 7 has a function of generating data (hereinafter, simply referred to as "cast data") such as physical attributes and social attributes which clearly indicates a type, a characteristic, a character, and the like of the video objects, and associating the data with corresponding video objects.

Similarly, with respect to respective video objects appearing in respective video scenes of the parent video divided by the video content interpreting unit 2, the scenario data generating unit 8 has a function of generating data (hereinafter, simply referred to as "scenario data") that clearly indicates a position, a motion, a movement, or the like of the video objects which is interpreted on the basis of a broadcast content, a scenario, and the like of the parent video which are interpreted in the video content interpreting unit 2 in accordance with a predetermined timetable, and associating the data with a corresponding video scene or a corresponding video object. Note that, specific contents of the scenario data and the cast data will be described later.

Next, the child video object data storing unit 9 and the processed data storing unit 10 are constituted by a predetermined storage device or a storage device of a server or the like, or a predetermined data storage medium such as a magnetic disk and an optical disc.

In addition, the video data of the child video object is stored in the child video object data storing unit 9. Note that, the stored child video object may be a single video object, or a plurality of video objects may be stored in a library aspect so that the automatic video production device 80 can freely select the child video object in correspondence with a viewer or a peripheral environment situation of the viewer, or a broadcast content and a scenario of the parent video content. In addition, the stored child video objects may be sequentially changed or updated in correspondence with predetermined conditions such as passage of time and transition of seasons.

On the other hand, various kinds of data such as cast data and scenario data which are generated or processed by the automatic video production device 80, a parent video data stream obtained by incorporating the pieces of data, and the like are appropriately stored in the processed data storing unit 10.

Note that, in FIG. 1, the child video object data storing unit 9 and the processed data storing unit 10 are illustrated as independent storage devices for convenience of explanation, but as a matter of course, the same storage device may be shared.

In addition, in FIG. 1, the child video object data storing unit 9 or the processed data storing unit 10 are provided inside the automatic video production device 80, but this example is not limited to the configuration. For example, the data storing units may be provided in an external server such as a cloud, and data exchange or control with the automatic video production device 80 may be performed by a predetermined communication unit or network.

Next, the video fusion producing unit 11 has a function of executing "video fusion production" processing for fusing the child video object to the parent video content by using various types of data such as the cast data and the scenario data. Specific content of the "video fusion production" processing will be described later.

Next, the video processing, editing, and rendering unit 12 has a function of actually executing processing such as video processing, editing, or rendering (video drawing) on the basis of a "video fusion production" processing result. Note that, the video processing, editing, or rendering processing can be executed by a predetermined digital image processing technology such as a computer graphic technology, a 3D morphing technology, and a shading technology, and thus detailed description thereof will be omitted here.

Finally, the control unit 20 is connected to the respective functional units through the data bus 25 and has a function of appropriately controlling functions of the functional units.

Note that, as described above, in the example illustrated in FIG. 1, an example in which the respective functional units are divided into blocks for every functional unit for convenience of explanation. However, actually, the automatic video production device 80 of this example may not be configured as the functional blocks divided as illustrated in the drawing. For example, processing in the functional units may be collectively executed by using a predetermined information processing device such as AI.

Note that, in the case of using the information processing device such as the AI as the automatic video production device 80 in this example, for example, when using the latest AI technology such as a deep learning technology, advanced estimation and determination capability closer to human thinking is provided, and thus the respective processing processes can be executed.

In addition, finally, the parent video content obtained by fusing the child video objects through the series of processing is reproduced by a video reproducing unit 13, and is reproduced or distributed and broadcasted to the viewer or user 60 through a predetermined display device 14.

Next, description will be given of examples of processing processes of the automatic video production device 80 in this example.

A series of processing processes in this example are divided into two processing processes, that is, as a first process, a "cast data and scenario data generating process" of generating the cast data and the scenario data over the whole play of the parent video content, and as a second process, a "video fusion producing, processing, and editing process" of performing video fusion production, and video processing, editing, and rendering processing by using the cast data and the scenario data generated in the above-described processing process, and reproducing or distributing and broadcasting the parent video content obtained by fusing child video objects toward the viewer or user 60 as necessary.

Figure 2:
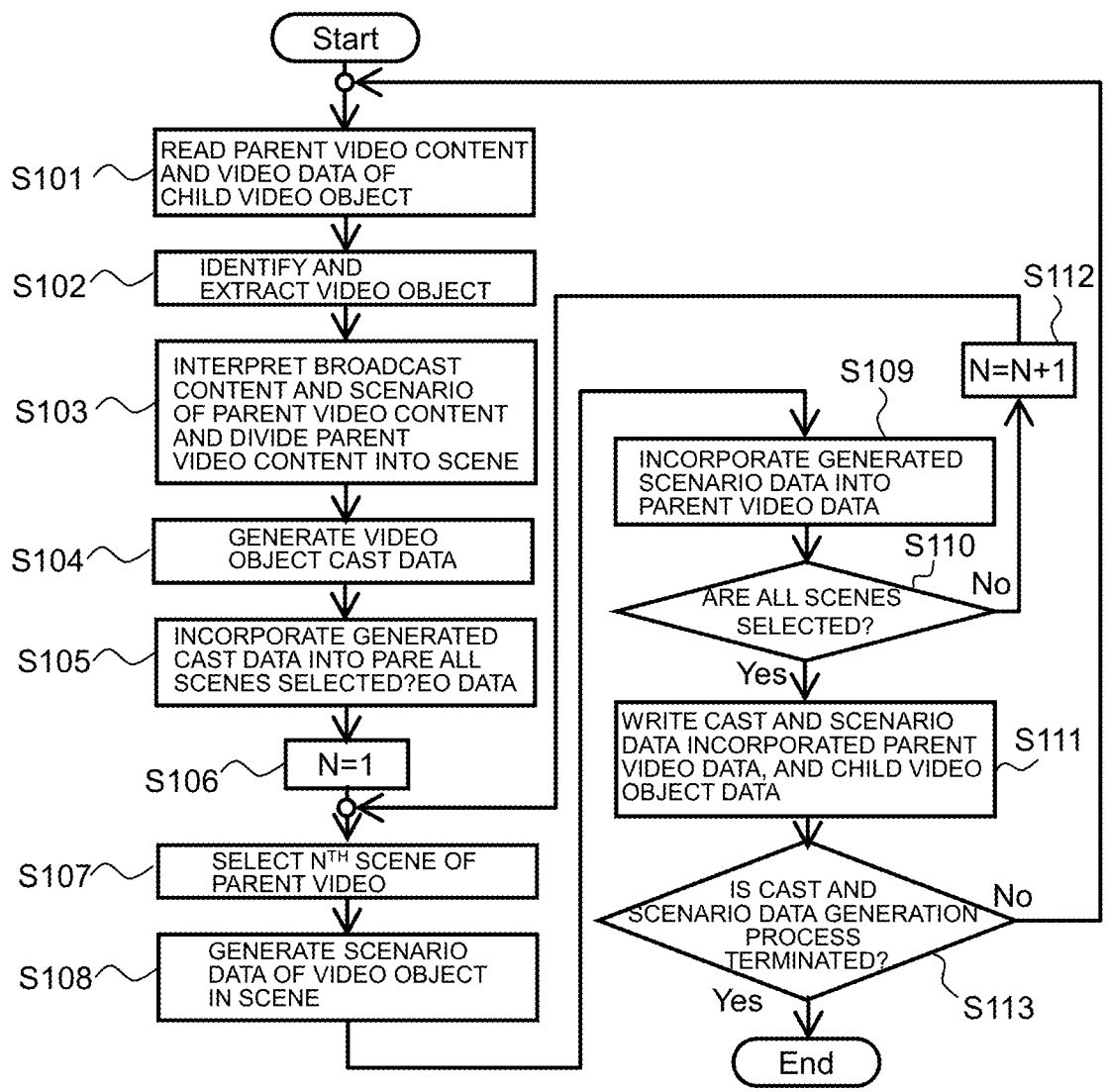
FIG. 2 is a processing flow chart of a process of generating cast data and scenario data in Example 1.

First, a processing flow of the "cast data and scenario data generating process" will be described. FIG. 2 is a flow chart of the cast data and scenario data generating process in this example.

In FIG. 2, first, in processing step 101 (S101, hereinafter, the processing step will be abbreviated as "S"), reading of the whole play of a parent video content and the entirety of video data of a child video object is executed.

In addition, in subsequent S102, a part or the entirety of video objects including a person, an object, a background, a landscape, and the like appearing in the parent video content 50 are identified and extracted as individual parent video objects, and a predetermined object identifier such as an object name and an ID number for distinction from other video objects is applied to the extracted parent video objects and child video objects which are additionally read.

In addition, in subsequent S103, a video content and a scenario of the whole play of the parent video content, that is, a story of the content, a view of the world, a framework of video production, or the like is interpreted from a position, movement, a dialogue, or the like of each of the parent video objects identified and extracted in S102, and the whole play of the content is appropriately divided into predetermined video scenes on the basis of the interpretation result. In addition, interpreted video content information, scenario information, or video scene division information is converted into data in a predetermined data description language or format, and is stored in the processed data storing unit 10.

In addition, in subsequent S104, predetermined cast data to be described later is generated with respect to each of the parent video objects identified and extracted in the previous processing step (hereinafter, referred to as "parent video objects"), or the child video objects. In addition, in subsequent S105, the parent video cast data is associated with a corresponding parent video object and is incorporated into a video data stream of the parent video content. In addition, cast data relating to the child video object is also associated with a corresponding parent video object, and is written to the child video object data storing unit 9, the processed data storing unit 10, or a predetermined data storing unit other than the storing units.

Next, in subsequent S106, first, a scene number N is set to 1, and an $N^{th}$ scene from the beginning of the parent video content is selected in subsequent S107.

In addition, in subsequent S108, predetermined scenario data to be described later is generated with respect to each parent video object appearing in the video scene of the parent video, and in subsequent S109, the scenario data is associated with a corresponding video scene and a corresponding video object, and is incorporated into the video data stream of the parent video content.

Here, description will be given of examples relating to the content and configuration of the cast data and the scenario data.

FIG. 3 is a schematic view illustrating a content and a data structure of the cast data generated in S104 in this example.

The cast data is data generated to allow the automatic video production device 80 to reliably recognize positioning or a role of the parent video object identified and extracted in S103 and the child video object in the parent video content or independently.

Accordingly, with regard to each of the video objects, the cast data is composed of the following data group or parameter group. In the data group or parameter group, on the basis of the video content information and the scenario information of the parent video content which are interpreted in S103, or interpretation information of the video object itself, various kinds of necessary information on classification, an attribute, a role, positioning, a characteristic, a character, and the like of the video object in the video content are converted into data or parameters, are associated with a corresponding object, and are comprehensively managed. Examples of the various kinds of information include the following items illustrated in FIG. 3.

(a) Physical attribute (an item that clearly indicates physical classification or an attribute of an object)
(b) Social attribute (with regard to a person or an animal, an item such as a social attribute, personality, and a character that characterizes the person or the animal in a video content, or an object-related item that cannot be clearly indicated by a physical attribute)
(c) Visual state (an item such as a shape, a dimension, and a color that clearly indicates a state recognizable from a video)
(d) Invisible state (at item such as a weight, a temperature, and feel that clearly indicates a state that is unrecognizable or difficult to recognize in a video)
(e) Correlation parameter (an item such as a human relationship, a social relationship, and a physical or chemical mutual relationship between objects which clearly indicate relationships between objects)

On the other hand, FIG. 4 is a schematic view illustrating the content and a data structure of the scenario data generated in S108 in this example.

The scenario data is data that is generated to allow the automatic video production device 80 to reliably recognize information corresponding to a scenario that is created and used in a drama or a play with respect to an individual parent video content. Accordingly, with regard to the video scene and each video object appearing in the scene, the scenario data is composed of the following data group or parameter. In the data group or parameter group, on the basis of the video content information and the scenario information of the parent video content which are interpreted in S103, or interpretation information of the video object itself, information on a position or movement of each video object in the video scene, restriction conditions applied thereto is converted into data or a parameter, is associated with a corresponding video scene and a video object, and is comprehensively managed. Examples of the information include the following items illustrated in FIG. 4.

(a) Three-dimensional position in a scene of the video object
(b) Direction or posture of the video object
(c) Dialogue (in the case of an object with dialogue), facial expression, gesture, and a behavior of the video object
(d) Predetermined restriction conditions applied to each video object or the entirety of the scene.

Note that, each item of the cast data or the scenario data is illustrative only, and there is no limitation to the item. Information on a predetermined item may be added as data or a parameter or may be arbitrarily selected in accordance with necessity for video production to be described later.

In addition, as a matter of course, with regard to a data description language that describes the cast data, the scenario data, the video content information data, the scenario information data, video scene division information data, and the like, or a format thereof may be an arbitrary description language and an arbitrary format as long as the automatic video production device can recognize the data description language and the format.

Here, description will return to the processing flow of the "cast data and scenario data creation process" in FIG. 2.

In S110 subsequent to S109, it is determined whether or not generation and incorporation of the scenario data is completed with respect to all scenes of the parent video. In a case where it is determined as "Yes", in subsequent S111, the parent video data stream to which the cast data or the scenario data is incorporated is written to the processed data storing unit 10 or another predetermined data storing unit, and the cast data associated with each child video object is also written to the child video object data storing unit 9 or the processed data storing unit 10. On the other hand, in the case of "No", processing of N=N+1 is performed in S112, the process returns to S107, and the series of processing processes are repeated.

Figure 5:
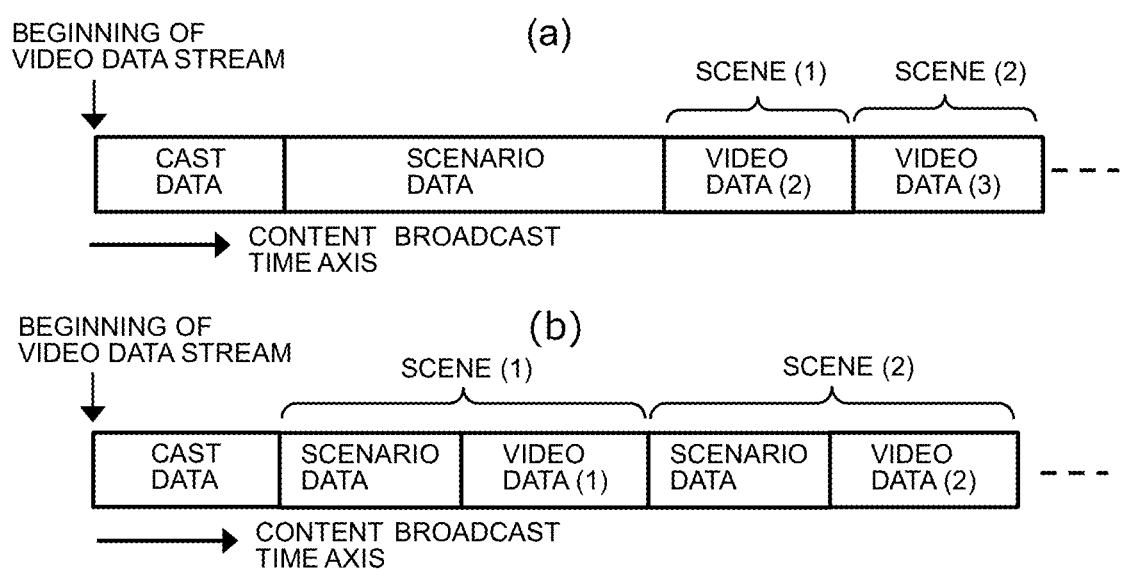
FIG. 5 is a schematic view illustrating a data stream structure of a cast data and scenario data incorporated video content in Example 1.

FIG. 5 illustrates a data stream structure of the cast data and scenario data incorporated parent video content in this example. FIG. 5(a) illustrates a data structure example in which the cast data and the scenario data are collectively arranged at the beginning of the data stream, and FIG. 5(b) illustrates a data structure example in which only the cast data is arranged at the beginning of the data stream, and the scenario data is arranged at the beginning of each video data that is divided for every scene.

Note that, FIG. 5 merely illustrates two examples, and the data stream structure is not limited to this example. As a matter of course, any data structure may be employed as long as the automatic video production device 80 can freely read and write.

Finally, when the cast data and scenario data generating and incorporating processing is completed for all scenes of the parent video content in accordance with the above-described processing flow, in S113, it is determined whether or not to terminate the series of "cast data and scenario data generating process". In a case where it is determined as "Yes", the processing process of the series of "cast data and scenario data generating process" is terminated. On the other hand, in the case of "No", the processes returns to S101, and the series of "cast data and scenario data generating process" are subsequently repeated with respect to an additional parent video content.

Figure 6:
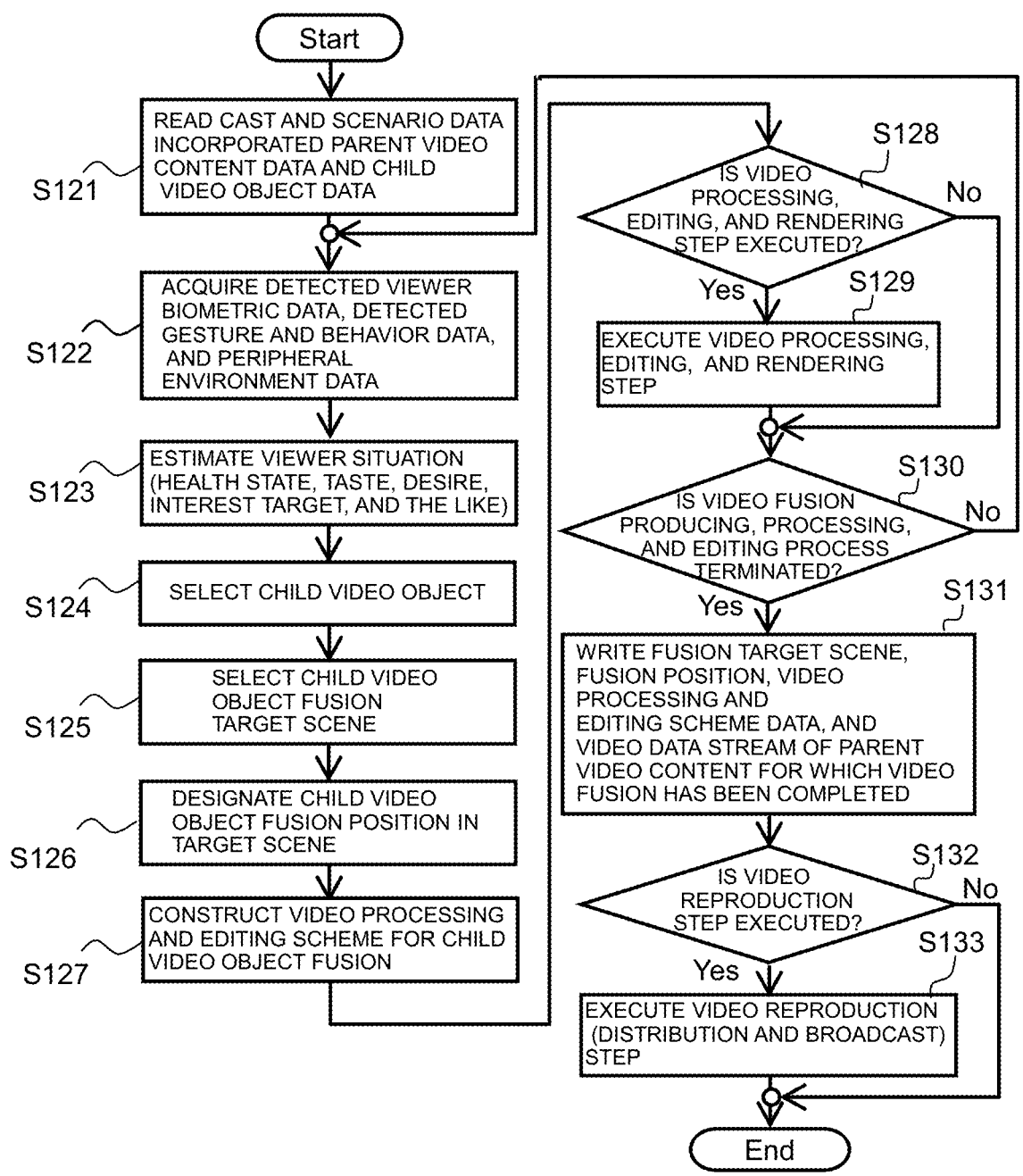
FIG. 6 is a processing flow chart of a video fusion producing, processing, and editing process in Example 1.

Next, description will be given of a processing flow of the "video fusion producing, processing, and editing process" that is another processing process. FIG. 6 is a flow chart of the video fusion producing, processing, and editing process in this example.

In FIG. 6, first, in S121, the video data stream of the cast data and scenario data incorporated parent video content which is generated in the "cast data and scenario data generating process" and is stored in a predetermined data storing unit, or all pieces of child video object data (video data of the child video objects and cast data associated with the child video objects) are read.

Note that, the cast data and scenario data incorporated parent video data stream that is read here is not limited to the video data stream generated in the "cast data and scenario data generating process". Of course, parent video data stream may be a parent video data stream generated in another video device or processing process, and for example, cast data, scenario data, and the like which are manually generated, and an original video content data stream may be individually read.

In subsequent S122, biometric data such as a respiration rate, a heart rate, a body temperature, a blood pressure, and a perspiration amount of a viewer or user 60 is detected and acquired from the viewer biometric data detecting unit 4. In addition, simultaneously, data such as changes in line-of-sight direction and facial expression which relate to a gesture or a behavior aspect of the viewer or user 60 is detected and acquired from the viewer gesture and behavior data detecting unit 5, and various kinds of data such as a temperature, humidity, an atmospheric pressure, and illuminance which relate to a peripheral environment state of the viewer or user 60 are detected and acquired from the peripheral environment data detecting unit 6.

Note that, the kind of the detection data is not limited to this example, and may be arbitrarily added or selected as necessary.

In subsequent S123, the automatic video production device 80 estimates a health state, a physiological state, a psychological state such as an emotion, a taste, a desire, and an interest target of the viewer or user 60 from the data detected and acquired in S122.

Note that, as described above, the automatic video production device 80 in this example is not limited to a configuration in which the estimation results of the health state, the physiological state, and the psychological state relating to the viewer or user 60 are set as selection conditions for an optimal video object to be described later, and selection may be performed in an arbitrary selection condition. In this case, as a matter of course, the data that is an acquisition target in S122 is not limited to the above-described data, and may be arbitrarily changed in accordance with selection conditions, and data on the viewer's situation as described above may not be necessary in accordance with the selection conditions. In this case, as a matter of course, S122 or S123 may be skipped or the processing steps may be omitted.

In addition, in subsequent S124, on the basis of the data that is detected and acquired, or the health state, the physiological state, and the psychological state of the viewer or user 60 which are estimated here, the automatic video production device 80 determines that the most appropriate appealing effect is to be obtained when which child video object is fitted or fused into the parent video at that point of time, and an optimal child video object is selected in single or a plurality of child video objects.

In addition, in subsequent S125, a fusion source video scene, to which the child video object selected from each scene of the parent video content is to be fused, is selected.

In addition, in subsequent S126, a screen position to which the target child video object is fitted or fused is designated in the video scene.

Here, particular attention should be paid to a case where an arbitrary parent video object exists at the child video object fitting or fusing position in the video scene. In this case, it is necessary to perform predetermined video processing or edition so that the both video objects are naturally and seamlessly fitted or fused without discomfort by paying attention to context or a superimposition relationship between the target child video object and the parent video object. A framework of video production by the video processing or edition is determined in subsequent S127.

Specifically, in S127, in order to naturally and seamlessly fuse the selected child video object into a target parent video object or a screen position without discomfort, a "video processing and editing scheme" that clearly indicates a content and a procedure of specific video processing and edition to be carried out on the child video object, the parent video object, or another parent video screen is constructed.

Note that, the four processing steps of S124, S125, S126, and S127 are processing processes which are executed mainly by the video fusion producing unit 11 in the block diagram of this example as illustrated in FIG. 1, and are the most important configuration elements in this example. Hereinafter, the processing processes are collectively noted as "video fusion production" step for convenience of explanation.

In the "video fusion production" process, the automatic video production device 80 determines and executes selection of the child video object and the parent video fusion target scene, designation of a child video object fusion position, and construction of a "video processing and editing scheme" on the basis of various types of data such as the cast data and the scenario data on the parent video object that is read in S127, the cast data of each child video object, the various types of data obtained in S122, and the estimation results for the health state, the physiological state, and the psychological state of the viewer or user 60 which are obtained in S123 on the basis of the various types of data obtained in S122.

In execution of the processing, for example, optimization processing for clearing "video fusion conditions" described below is performed.
  (a) Do not interfere with the story and content image of the content recalled from a broadcast content and a scenario of the parent video content.
  (b) Predetermined appealing effect is created by fusion of the child video object.
  (c) No irrationality and physical contradiction due to fusion of the child video object.
  (d) Do not give a viewer discomfort or feeling of repulsion due to fusion of the child video object.

Note that, for example, "No irrationality and physical contradiction" in (c) among the "video fusion condition" examples specifically represents that there is no irrational video such as "an object is floating in the air even though there is no support", or "an entity slips through a wall".

However, for example, in a case where it is determined that it is appropriate to perform fantasy or SF-like video production so as to clear other "video fusion conditions", the production is also permitted in production with the above-described irrationality and physical contradiction.

As described above, the "video fusion conditions" can be appropriately relaxed or strengthened in consideration of the balance of the respective conditions. In addition, with regard to the "video fusion conditions", the above-described items (a) to (d) are merely illustrative only, and as a matter of course, there is no limitation to the above-described items. A user or a manager of the automatic video production device 80 can arbitrarily add, delete, or change the conditions.

Next, in S128, in subsequent to the "video fusion production" step, on the basis of the processing result, it is determined whether or not to actually execute video fusion processing such as video processing, editing, and rendering processing. In the case of "Yes", in subsequent S129, actually, video processing, editing, or rendering processing is executed. Note that, as described above, the video processing, editing, or rendering processing can be executed by using a predetermined digital image processing technology such as a computer graphic technology, a 3D morphing technology, and a shading technology, and thus detailed description thereof will be omitted. On the other hand, in the case of "No", S129 is skipped, and in subsequent S130, it is determined whether or not a series of "video fusion producing, processing, and editing process" is completed with respect to the whole play of the parent video content. In a case where it is determined as "Yes", the processing flow returns to S122 again, and the series of process is repeated. On the other hand, in the case of "No", the process transitions to subsequent S131.

In addition, in S131, various types of data such as a selection result of the fusion target parent video scene, a designation result of the fusion target parent video object or the screen position, and the "video processing and editing scheme" which are obtained in the "video fusion production" step are written to the processed data storing unit 10 as predetermined video fusion production data. In addition, a video data stream of the parent video content for which the series of video fusion processing is completed is also written to the processed data storing unit 10 or another predetermined data storing unit.

In addition, in subsequent S132, it is determined whether or not to reproduce the parent video content for which the series of video fusion processing is completed. In a case where it is determined as "Yes", in subsequent S133, video reproduction, distribution, or broadcast is actually executed. On the other hand, in the case of "No", S133 is skipped, and the series of processing flow relating to the "video fusion producing, processing, and editing process" is completed.

Note that, in this example, for convenience of explanation, description has been given of a processing flow in which after the series of "video fusion producing, processing, and editing process" is completed with respect the whole play of the parent video content, reproduction or distribution and broadcast processing of the parent video content that has undergone the video fusion processing is executed again, but this example is not limited thereto. Specifically, it is possible to employ a mechanism in which the "video fusion producing, processing, and editing process" is preceded, and chasing reproduction or distribution and broadcast of the parent video content that has undergone the video fusion processing is executed in parallel.

Next, description will be given of a specific processing procedure in each processing step of the "video fusion producing, processing, and editing process" described in FIG. 6 with reference to a specific processing example.

FIG. 7 is a schematic table showing a specific processing procedure for every processing step in the video fusion producing, processing, and editing process with respect to an arbitrary video fusion processing example. The processing example introduced here is an example in which a live concert video of an idol (pseudonym (A)) is taken up as a produced parent video content that is a video fusion source, a product that is commercially available from a beverage maker (pseudonym (B)) is incorporated to the produced live concert video as a CM video, and the resultant live video concert is distributed or broadcasted. Note that, with regard to the produced parent video content, it is assumed that predetermined cast data and scenario data are generated already by the "cast data and scenario data generating process", and is incorporated into a video data stream.

In addition, in FIG. 7, characters described in a processing step column correspond to respective step names described in FIG. 6, and outlines of processing contents in the processing steps are described in a processing content column. In addition, in a specific processing example column, the specific processing contents in this example are described with sentences and schematic views.

In FIG. 7, when Company (B) makes a request for CM video presentation, first, a live concert video data stream into which the cast and scenario data is incorporated is read into the automatic video production device 80 (S121).

Next, the automatic video production device 80 detects and acquires pieces of data on a biometric situation, facial expression, a gazing target (=interest target), a peripheral environment, and the like of a viewer from various types of sensors (S122).

In addition, the automatic video production device 80 estimates that the viewer 60 is in a state in which the viewer 60 is currently thirsty, and wants some kind of drinking water from the pieces of data which are detected and acquired. The automatic video production device 80 determines that when a video of the drinking water is incorporated into the live video, a high CM appealing effect will be obtained (S123).

Therefore, as a child video object (CM video target) to be incorporated into the parent video, a video of a soft drink PET bottle (C) manufactured by Company (B) is selected, and the video object data is read (S124).

Next, the automatic video production device 80 recognizes that the parent video content is a video of a live concert in which the idol (A) is playing a leading role, and determines that the video of the PET bottle (C) that is a child video object is to be naturally fused to a video scene in which the idol (A) is dancing in the live concert as video production for obtaining a predetermined CM appealing effect without deteriorating the content image. The automatic video production device 80 selects a dancing scene that becomes a video fusion source in the video scene of the parent video content (S125).

In addition, the automatic video production device 80 designates the right hand of the idol (A) as a specific child video object (PET bottle (C)) fitting position in the dancing scene that is selected. In order to realize natural and seamless video fusion, the automatic video production device 80 determines that production is to be changed to a video in which the idol (A) is dancing with the PET bottle (C) held with the right hand (S126).

Therefore, in order to change the production from the original parent video in which the hand is empty to a video in which the idol (A) is dancing with the PET bottle (C) held by the right hand, the automatic video production device 80 determines and constructs the "video processing and editing scheme" that clearly indicates a specific content and a specific procedure in video processing or edition that is desired to be carried out to the parent video side or the child video object (S127).

Here, as the outline of the "video processing and editing scheme", for example, as shown in FIG. 7, the following items and the like are exemplified.

(a) Match a superimposition state (front-back relationship) between respective fingers of the right hand of (A) and a PET bottle (b) Process a video of the open right fingers of (A) into a video of fingers holding the PET bottle (c) Adjust an irradiation state and reflection state of illumination light emitted to the PET bottle (d) Add a shadow created by the PET bottle and change a shadow created by the fingers which are changed Note that, the above-described configuration is an example of the "video processing and editing scheme" and an outline thereof, and actually, more specific and detailed scheme is constructed.

In addition, the "video processing and editing scheme" constructed as described above is applied to an actual moving image by using a predetermined digital image processing technology such as a computer graphic technology, a 3D morphing technology, and a shading technology (S129).

In addition, finally, the parent video content into which the child video object (PET bottle (C)) is accurately fused, that is, a live video including a scene in which the idol (A) is dancing while holding the PET bottle (C) as a predetermined dancing scene is distributed and broadcasted to the viewer 60 (S133).

As described above, when using the automatic video producing unit or device of this example, with respect to a predetermined video content, a predetermined video object independent from the video content can be naturally and seamlessly fused without deteriorating the story and a content image of the video content.

In addition, according to the automatic video production device of this example, the following flexible countermeasure can be made. Specifically, a video object to be fused may be selected to be suitable for an emotion, a taste, a desire, an interest, and the like of each viewer or each user, effective video fusion may be appropriately executed in conformity to a situation change of the viewer or the user in real time (for example, while the viewer or the user is viewing the video content).

Accordingly, in consideration of the characteristics, it can be said that the automatic video production device as in this example is very effective for CM video incorporation into the video content shown in FIG. 7.

Note that, in the case of using the automatic video production device of this example for the CM video incorporation into a predetermined video content or the like, it is possible to combine a mechanism of counting the number of times of fitting or fusion displaying of a target CM video into the parent video content, time taken for the fitting or fusion displaying, or the like, and giving a restriction on CM provision or charging a CM sponsor side a predetermined CM fee in correspondence with the count result, or the like. Of course, the automatic video production device of this example may be used for any use without limitation to the use for the incorporation of the CM video into the video content as described above.

Example 2

In Example 1, first, the cast data and the scenario data are generated at once with respect to the whole play of the parent video content by the "cast data and scenario data generating process", and after carrying out incorporation into the parent video data stream, the video fusion processing for the child video object is carried out by the "video fusion producing, processing, and editing process" in two steps as described above.

In contrast, it is possible to perform fitting and fusion processing of the child video object by antecedently reading a parent video content in parallel while reproducing or distributing and broadcasting the parent video content.

Therefore, in this example, description will be given of an example in which an automatic video production device that executes reproduction or distribution and broadcast processing for parent video content, and video fusion production, processing, and edition processing to the parent video content in a simultaneous parallel manner is provided in a video content supply server that broadcasts and distributes the parent video content, or the like.

A configuration block diagram of the automatic video production device in this example is similar as in FIG. 1, and thus the configuration block diagram will be omitted.

Figure 8:
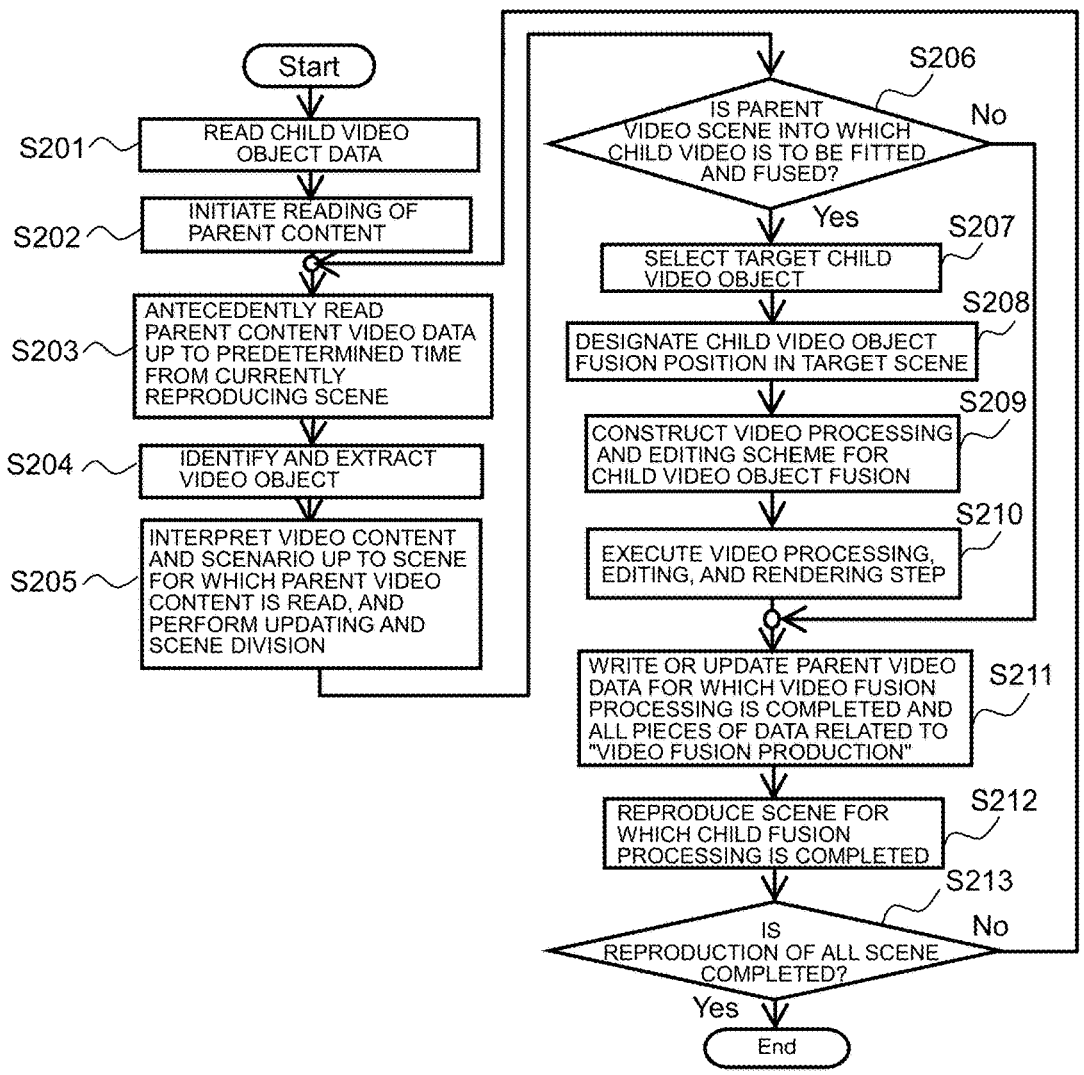
FIG. 8 is a flow chart of a processing process in Example 2.

FIG. 8 is a flowchart relating to a processing process in this example.

In this example, as a preliminary preparation before initiating a series of processing processes, with respect to each child video object stored in the child video object data storing unit 9, predetermined data or data group obtained by converting predetermined information on a classification, an attribute, a characteristic, or the like of the child video object into data or a parameter, that is, data corresponding to the cast data described in the example of the "cast data and scenario data generating process" in FIG. 2 is stored in a predetermined data storing unit in a type of being associated with the child video object.

In FIG. 8, first, in S201, an automatic video production device 80 reads all pieces of child video object data, that is, video data of the child video object and cast data associated with the child video object from a predetermined data storing unit.

Next, in S202, reading of video data of the parent video content is initiated. In addition, in subsequent S203, the automatic video production device 80 initiates reproduction of the parent video content, and antecedently reads video data of the parent video that is to be reproduced or distributed and broadcasted up to predetermined time from a currently reproducing scene, for example, from several seconds to several tens of seconds in a simultaneous parallel manner.

In addition, in subsequent S204, with respect to the antecedently read video, as in S102 described in FIG. 2, all objects including a person, an object, a background, a landscape, and the like newly appearing in the video are identified and extracted as individual video objects, and a predetermined object identifier such as an object name and an ID number for distinguishing the extracted video objects from other video objects is applied to the extracted video objects.

Next, in S205, with regard to the antecedently read video, a video content and a scenario thereof are interpreted from information data such as a position, a movement, and a dialogue of each of the parent video object identified and extracted in S204, and the read video is divided into predetermined video scenes on the basis of the interpretation information in correspondence with necessity.

Note that, S205 is mainly executed by a functional unit corresponding to the video content interpreting unit 2 in the block units of the automatic video production device 80. With regard to the video content interpreting unit 2, in Example 1, a function of reading the entirety of the parent video content at once, and performing interpretation of a broadcast content and a scenario, and scene division processing with respect to the whole play is provided. However, as described above, the video content interpreting unit 2 of this example can be realized by a function of interpreting a video content and a scenario and performing scene division processing with respect to a video that has been read antecedently from initiation time of video reproduction or distribution and broadcast of a corresponding parent content to that point of time, that is, video data up to a middle stage of the video content. In this regard, this example and Example 1 are slightly different in the function.

Note that, in the case of video interpretation at the middle stage of the content, as a matter of course, video content information that is interpreted in accordance with progress in reading and interpretation of the parent video data, and scene division information are sequentially added. In addition, on the basis of the added information, scenario information of the video content from initiation of distribution and broadcast to that point of time is sequentially updated in an aspect in which predetermined addition, change, or correction is applied.

Therefore, the video content interpreting unit 2 or the control unit 20 that controls the video content interpreting unit 2 in this example also has a function of sequentially updating the video content information, the scenario information, the scene division information, and the like into the latest information data to which addition, change, or correction is applied, and then storing the information data in a predetermined processed data storing unit 10.

In addition, in subsequent S206, it is determined whether or not the antecedently read parent video scene is a parent video scene into which the child video object is to be inserted and fused. In addition, in a case where it is determined as "Yes", the process proceeds to processing from S207 to be described later. On the other hand, in the case of "No", from S207 to S210 to be described later are skipped, and the process proceeds to S211.

In subsequent S207, in a case where a plurality of kinds of child video objects exist, a child video object becomes a fitting or fusion target into a target parent video scene is selected among the child video objects.

In addition, in subsequent S208, in the fusion target parent video scene, a screen position into which the target child video object is to be fitted or fused is designated.

In addition, in subsequent S209, in order to naturally and seamlessly fuse the selected child video object to the target parent video object or the screen position without discomfort, a "video processing and editing scheme" that clearly indicates the content and procedure of specific video processing and edition to be carried out on the child video object, the parent video object, or another parent video screen is constructed.

Note that, specific processing content and procedure in the respective processing steps are completely the same as the so-called "video fusion production" processing steps described in S124 to S127 illustrated in FIG. 6, and thus detailed description thereof will be omitted.

However, in this example, since a series of processing is executed from the video data of the antecedently read parent video content in parallel while reproducing or distributing and broadcasting the parent video content differently from the case of Example 1, there are many time constraints in comparison to the case of Example 1, and thus high-speed processing is required.

Therefore, in respective determination, selection, and designation processing steps in S206, S207, and S208, for example, the following method or the like can be used. Specifically, a part or the entirety of the cast data on the child video object side is set as a predetermined keyword, suitability, an appealing effect, or the like of each parent video scene with respect to the keyword is evaluated with a predetermined numerical value or parameter, and the magnitude is set as a reference for determination or selection to perform the processing at a high speed.

In addition, even in the "video processing and editing scheme" construction processing step in S209, the "video processing and editing scheme" that is constructed may be partially simplified or omitted.

For example, with regard to the "video processing and editing scheme", video fusion production in which only a front-back relationship or a superimposition relationship between a child video object to be fitted into a predetermined video scene of the parent video and an existing parent video object in the parent video scene is defined, or production in which fitting of a predetermined selected child video object or a part thereof into a designation screen position in a predetermined video scene of the parent video which is selected in the same manner may be employed, and in the video fusion production, the entirety of a production procedure of video processing or edition may be omitted.

Next, in S210, video processing, editing, and rendering processing is actually performed on the basis of the "video fusion production" result constructed as described above. The processing is executed by using a predetermined digital image processing technology such as a computer graphic technology, a 3D morphing technology, and a shading technology as described in S129 in the practical case of FIG. 6 and FIG. 7.

In addition, in subsequent S211, processing of sequentially writing the parent video data for which the child video fitting or fusion processing is completed in a predetermined processed data storing unit 10 is performed. Note that, processing of writing or updating various types of data related to the "video fusion production" such as the parent video scene or the child video object as a fusion target, a designation result of a screen position into which a target child video object is fitted or fused in the fusion target parent video scene, and the "video processing and editing scheme" which are obtained in the "video fusion production" processing in combination with the above-described video data may be performed.

In addition, in subsequent S212, the parent video data that is written to the processed data storing unit 10 in S211 and for which video fitting or fusion processing is completed is read out, and a video scene subsequent to a currently reproducing video scene is reproduced or distributed and broadcasted.

In addition, in subsequent 3213, it is determined whether or not all scenes of the parent video content are reproduced or distributed and broadcasted. In a case where it is determined as "No", the process returns to S203, and a series of processing processes are repeated. On the other hand, in the case of "Yes", the series of processing processes are terminated.

Figure 9:
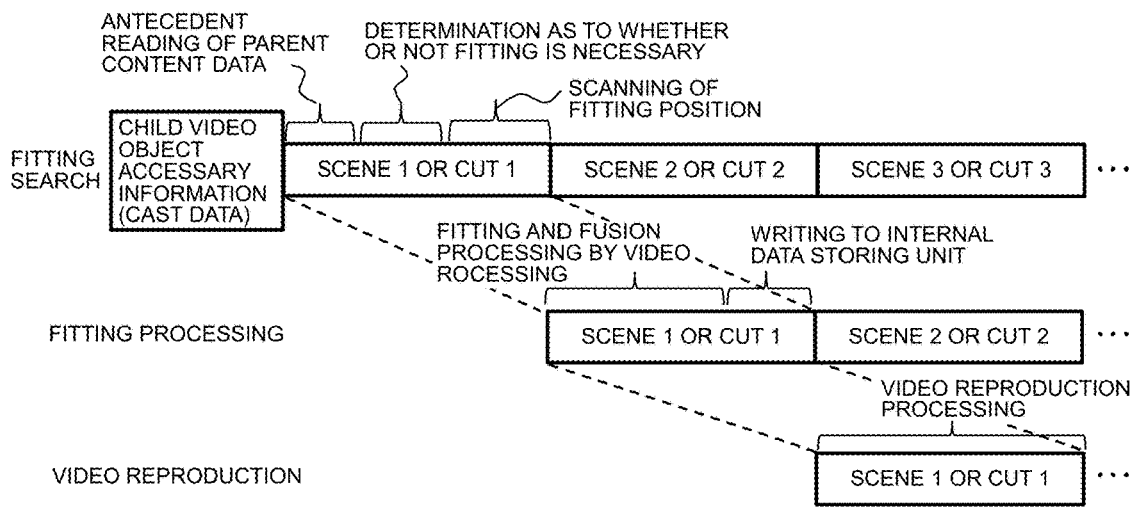
FIG. 9 is a schematic view conceptually illustrating a flow of the processing process in Example 2.

FIG. 9 is a schematic view conceptually illustrating a flow of the processing process in the automatic video production device of the antecedently reading type illustrated in this example.

As illustrated in FIG. 9, when the series of processing processes start, first, the automatic video production device 80 reads video data of a child video object to be fitted into the parent video content and accessary information thereof, that is, so-called cast data.

Next, the automatic video production device 80 antecedently reads video data of the parent video content for every predetermined video scene or video cut from the beginning, determines whether or not to fit a target child video object for every read parent video scene or cut, and performs scanning (searching) of a fitting position. For example, this is set as an $n^{th}$ scene or cut.

In the subsequent step, in a case where the $n^{th}$ parent video scene or cut is the child video object fitting target, processing of fitting the child video object into a designation position of the parent video scene or the cut is actually performed. In addition, simultaneously, the antecedently reading processing and the like are simultaneously performed with respect to the subsequent $n+1^{th}$ parent video scene or cut.

In addition, in the subsequent step, the child video object fitting processing with respect to the $n+1^{th}$ parent video scene or cut, and the antecedently reading processing and the like with respect to an n+2$^{th}$ parent video scene are performed simultaneously while performing video reproduction of the n$^{th}$ parent video scene or cut.

In this manner, the processing process of performing a plurality of processing steps sequentially and in a simultaneous parallel manner is typically referred to as pipeline processing. In this example, the pipeline processing is employed, and thus it is possible to execute fitting video production of a predetermined child video object into the parent video content in parallel while reproducing or broadcasting and distributing a predetermined parent video content approximately in real time.

As described above, the automatic video production device in this example executes the processing process of comprehensively performing the "cast data and scenario data generating process" illustrated in FIG. 2 and the "video fusion producing, processing, and editing process" illustrated in FIG. 6 in Example 1.

However, in this example, a series of processing including cast data generation and incorporation thereof into the parent video data in S104 and S105 and scenario data generation and incorporation thereof into the parent video data in S108 and S109 in FIG. 2 are omitted. The reason for this is as follows. As in this example, in the automatic video production device that performs fitting and fusion processing of the child video object into the antecedently read parent video scene in parallel to reproduction of the parent content, since high-speed processing is required, the series of processing are omitted as a countermeasure for reducing processing load as an example. Accordingly, in a case where processing capability of the automatic video production device is sufficiently high, as in the example illustrated in FIG. 6, processing of generating the cast data and the scenario data, and processing of incorporating the cast data and the scenario data into the parent video data may be added. When adding the processing, in the case of fitting and fusing an arbitrary child video object into a future target parent video content again, as in Example 1 illustrated in FIG. 6, it is possible to perform more complex and advanced video fusion production processing that uses the cast data and the scenario data.

In addition, similarly, in this example, differently from the processing process in Example 1 illustrated in FIG. 6, the processing steps (S122 and S123 in FIG. 6) of detecting and acquiring data on a biometric situation of a viewer, a peripheral environment, or the like from various sensors, and estimating a health state, a physiological state, a psychological state, and the like of a target viewer, and a series of processing that reflects the estimation result on processing of selecting a child video object to be fitted into the parent video content, the video fusion production processing, and the like are omitted. This configuration is also an example as a countermeasure for reducing processing load so as to realize high-speed processing as described above. Accordingly, in a case where processing capability of an automatic video production unit or device is sufficiently high, as a matter of course, it is also possible to perform advanced video fusion production that detects and estimates viewer-related information, and reflects the estimation result as in the example illustrated in FIG. 6.

In addition, in the case of using the automatic video production device as in this example for incorporation of a CM video into a video content, or the like, as in Example 1, it is possible to combine a mechanism of counting the number of times of fitting or fusion displaying of a target CM video into the parent video content, time taken for the fitting or fusion displaying, or the like, and giving a restriction on CM provision or charging a CM sponsor side a predetermined CM fee in correspondence with the count result, or the like.

As described above, according to this example, it is possible to perform fitting and fusion processing of the child video object by antecedently reading a parent video content in parallel while reproducing or distributing and broadcasting the parent video content.

Example 3

In Example 2, description has been given of an example in which the automatic video production unit or device that performs fitting and fusion processing of child video object in parallel while reproducing or distributing and broadcasting the parent video content is provided on a video content supply server that broadcasts and distributes the parent video content, or the like. However, an automatic video production unit or device having a similar function may be provided on a so-called edge terminal side represented by a smart phone or the like that is carried by a typical user.

Therefore, in this example, description will be given of an automatic video production device that has a similar function as in Example 2 and is provided in an edge terminal such as a smart phone.

Figure 10:
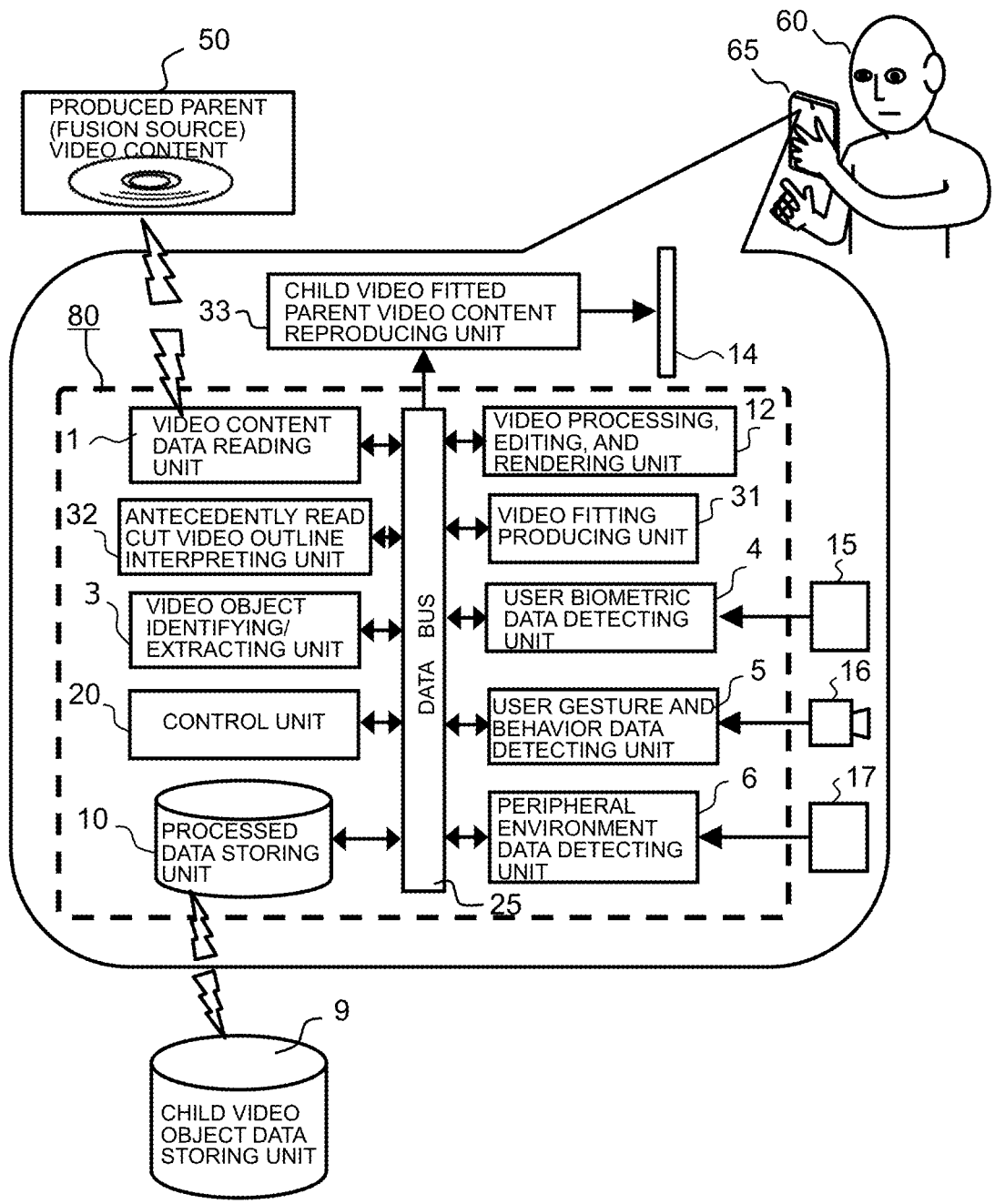
FIG. 10 is a configuration block diagram of an automatic video production device in Example 3.

FIG. 10 is a block diagram illustrating a schematic configuration of the automatic video production device in this example. Note that, in FIG. 10, the same reference numeral is given to a functional unit having a similar function as in FIG. 1.

In FIG. 10, an automatic video production device 80 in this example is embedded in an edge terminal 65 such as a smart phone that is carried by a user 60. As in the automatic video production device of Example 1 illustrated in FIG. 1, respective functional units such as the video content data reading unit 1, the video object identifying/extracting unit 3, the viewer biometric data detecting unit 4, the viewer gesture and behavior data detecting unit 5, the peripheral environment data detecting unit 6, the processed data storing unit 10, the video processing, editing, and rendering unit 12, and the control unit 20 are arranged in the automatic video production device 80. In addition, a predetermined biometric sensor 15, a viewer monitor camera 16 that is a visual sensor, an environment sensor 17, or the like is connected to each of functional units of the viewer biometric data detecting unit 4, the viewer gesture and behavior data detecting unit 5, and the peripheral environment data detecting unit 6. The functional units and the sensors have a similar function as that of that functional units illustrated in FIG. 1, and thus detailed description thereof will be omitted here.

On the other hand, in this example, an antecedently read cut video outline interpreting unit 32 is arranged instead of the video content interpreting unit 2 in FIG. 1.

In this example, it is necessary to interpret sequentially and antecedently read video information approximately in real time instead of interpreting detailed video contents with respect to each video scene that constitutes the contents after reading the whole play of the parent video content as in Example 1. In addition, as in this example, in a case where the automatic video production device 80 is provided on the edge terminal side such as the smart phone, the processing capability is limited, and thus it is difficult to advanced video interpretation processing as in Example 1.

Therefore, in this example, the antecedently read cut video outline interpreting unit 32 has a function of extracting a video cut, which is a video unit obtained by further subdividing the video scene, from sequentially and antecedently read video information, and interpreting an outline of the cut from the kind of a video object appearing in the video cut, an arrangement thereof, or the like at a high speed.

In addition, in this example, for example, high-speed processing is realized by arranging a video fitting producing unit 31 in which video fusion production is specialized only in the fitting production of the child video object into the parent video cut, and a processing function is simplified as described later instead of the video fusion producing unit 11 in Example 1.

In addition, in this example, video data of the child video object to be fitted into the parent video is stored in the child video object data storing unit 9 provided in an external server. In addition, with respect to each child video object, the cast data described in the "cast data and scenario data generating process" in FIG. 2, that is, predetermined data or data group obtained by converting predetermined information on classification, an attribute, a characteristic, and the like of the child video object into data or a parameter is stored in the child video object data storing unit 9 in a type of being associated with the child video object. In addition, the child video object related data is appropriately read into the automatic video production device 80 in this example by a predetermined communication unit.

Note that, the external server provided with the child video object data storing unit 9 may be a dedicated server that is managed by a CM sponsor, a predetermined video content distribution company, or the like, or may be a general-purpose server such as a cloud that is connected through the Internet or the like.

Figure 11:
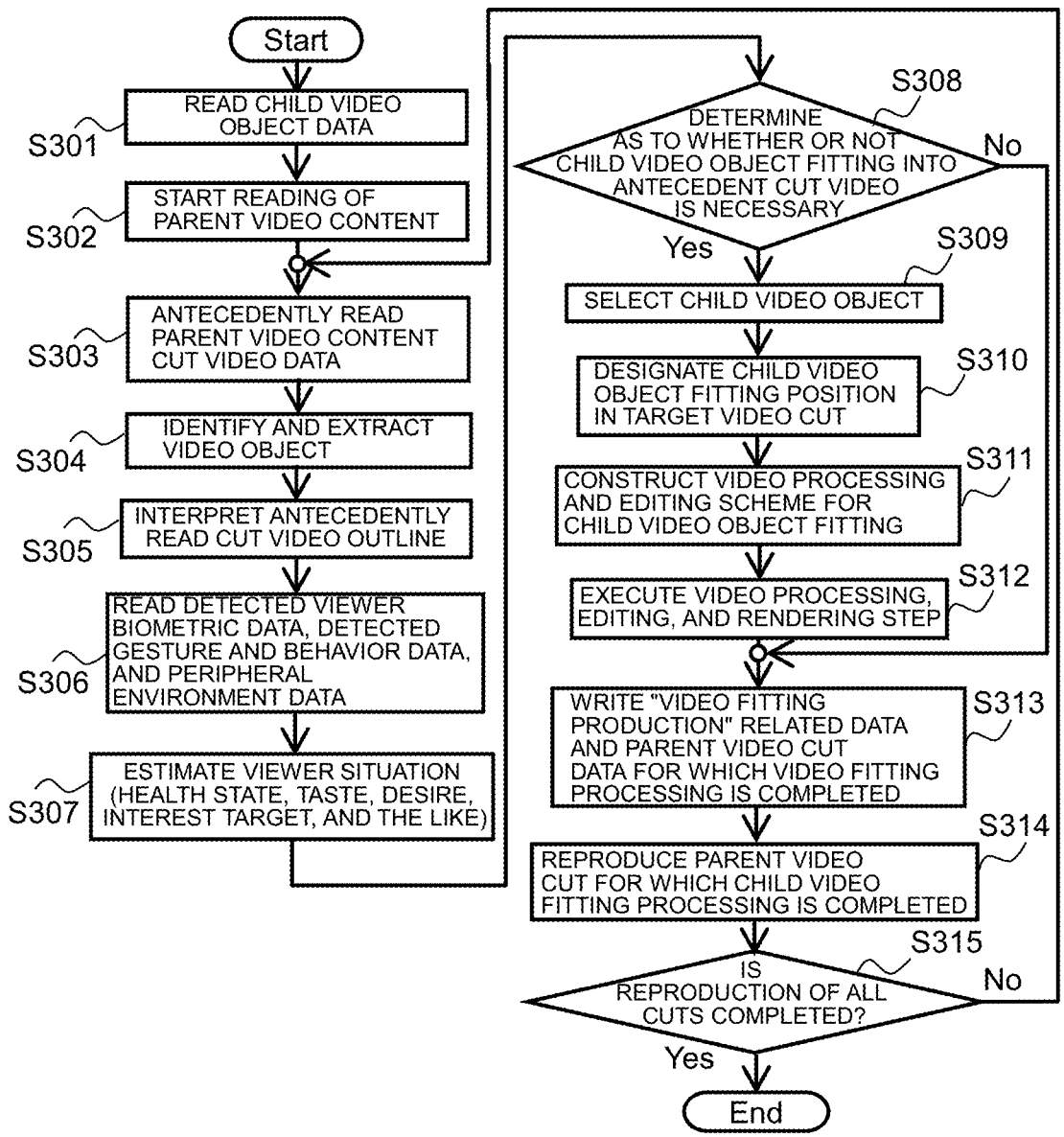
FIG. 11 is a flow chart of a processing process in Example 3.

FIG. 11 is a flowchart relating to a processing process in this example. In FIG. 11, first, in S301, the automatic video production device 80 reads video data of each child video object that is a target, predetermined data or data group obtained by predetermined information on classification, an attribute, a characteristic, or the like of the child video object into data or a parameter, that is, data corresponding to the cast data described in the example of the "cast data and scenario data generating process" in FIG. 2 from the child video object data storing unit 9 arranged at the outside in a type of being associated with the child video object.

Next, in S302 and S303, as in S202 and S203, reading of video data of the parent video content starts, reproduction of the parent video content is initiated, and video data of the parent video that is to be reproduced or distributed and broadcasted up to predetermined time from a currently reproducing scene is antecedently read in a simultaneous parallel manner.

In addition, in subsequent S304, the antecedently read parent video is subdivided into a predetermined video cut as described above, and for each of the subdivided video cut, as in S102 in the "cast data and scenario data generating process" described in FIG. 2 of Example 1, all objects including a person, an object, a background, a landscape, and the like newly appearing in the video cut are identified and extracted as individual video objects.

Next, in S305, an outline of a target parent video cut is interpreted from the kind, an arrangement in a video, or the like of each parent video object identified and extracted in S304.

In addition, in S306, as in S122 in FIG. 8, various types of biometric data of the viewer or user 60 is detected and acquired from the viewer biometric data detecting unit 4, data on a gesture or a behavior aspect of the viewer or user 60 is detected and acquired from the viewer gesture and behavior data detecting unit 5, and various types of data on a peripheral environment state of the viewer or user 60 are detected and acquired from the peripheral environment data detecting unit 6.

In addition, in subsequent 3307, as in S123 illustrated in FIG. 8, the automatic video production device 80 estimates a health state, a physiological state, a psychological state such as an emotion, a taste, a desire, and an interest target of the viewer or user 60 from each data detected and acquired in S306.

Note that, in the automatic video production device 80 in this example, the detection data on the health state, the physiological state, and the psychological state relating to the viewer or user 60 and the estimation result as described above are not necessary, the detection data or an estimation target may be arbitrarily changed as necessary, and a processing process that does not particularly require various types of data on the viewer or user may be employed. In this case, as a matter of course, S306 and S307 may be skipped, or the processing steps may be omitted.

In subsequent S308, it is determined whether or not an antecedently read parent video cut is a parent video cut of a target into which the child video object is to be fitted. In a case where it is determined as "Yes", the process proceeds to processing from S309 to be described later. On the other hand, in the case of "No", from S309 to S312 to be described later are skipped, and the process proceeds to S313.

In addition, in subsequent S309, in a case where a plurality of kinds of child video objects exist, a child video object that becomes a fitting or fusion target into a target parent video scene is selected among the child video objects.

In addition, in subsequent S310, in the fitting target parent video cut, a screen position into which a target child video object is to be fitted is designated.

By the way, in determination of a child video fitting target parent video cut in S308, in selection of the child video object in S309, and in designation of the fitting position of the child video object in S310, for example, the following method or the like can be used. Specifically, a part or the entirety of the cast data on the child video object side is set as a keyword, suitability, an appealing effect, or the like of the keyword is converted into a numerical value from the outline of the target parent video cut, or in correspondence with necessity, the biometric data, the gesture, the behavior data, and the peripheral environment data of the viewer which are detected in S306, an estimation result of a viewer situation, or the like, and the magnitude of the value is set as a reference for determination or detection to perform the processing at high speed.

In addition, in subsequent S311, in order to very naturally and seamlessly fit the selected child video object into the designated screen position in the parent video cut without discomfort, a "video processing and editing scheme" that clearly indicates a content and a procedure of specific video processing and edition that is carried out on the child video object or the parent video cut screen is constructed.

However, as in Example 2, in this example, since a series of processing are executed from video data of an antecedently read parent video content in parallel while reproducing or distributing and broadcasting the parent video content, there are many time constraints in comparison to the case of Example 1, and thus high-speed processing is required. Therefore, even in the "video processing and editing scheme" construction processing step in S311, as in S209, the "video processing and editing scheme" may be partially simplified or omitted. Note that, details of the processing are similar as in S209, and description thereof will be omitted.

Next, in S312, video processing, editing, and rendering processing is actually executed on the basis of the "video fusion production" result constructed as described above. The processing is similar as in S210 illustrated in FIG. 6, and thus description thereof will be omitted.

In addition, in subsequent S313, processing of sequentially writing child video fitted parent video data to the predetermined processed data storing unit 10 is performed. Note that, details of the processing are similar as in S211, and thus description thereof will be omitted. The subsequent S314 and S315 are similar to S212 and S213 in FIG. 6, and thus description thereof will be omitted.

As described above, according to this example, it is possible to provide an automatic video production device which is provided in an edge terminal such as a smart phone and of which processing capability is simplified.

Example 4

In Examples 1 to 3, as the parent video that becomes the video fusion source, a predetermined produced video content represented by a drama, a recorded live video, or the like is set as a target. That is, video contents, in which a content story and a content scenario and a video content related to all video scenes in the contents are defined, are set as a target.

However, for example, in the Augmented Reality (AR) and Mixed Reality (MR) which have attracted attention as a next generation video, a video technology of fitting or fusing a predetermined virtual video into a real image that is visually recognized by a user (an HMD wearer) by using an AR or MR display device such as a Head-Mounted Display (abbreviated name HMD) is necessary.

In the case of the AR or the MR, a video that becomes a base for video fitting or fusion, that is, the parent video corresponds to a real image that is visually recognized by a user, that is, the HMD wearer in real time (hereinafter, the real image which the user is viewing is referred to as "real view image"), a video scene or a video cut of the real image varies from moment to moment due to a user's gesture, a user's motion, or the like such as a variation in an object that is visually recognized by the user, an external world situation around the object, and a variation in a line-of-sight direction. Accordingly, the content and the scenario of the parent video are not completely constant.

In this example, description will be given of an automatic video production device capable of performing fitting or video fusion of a predetermined child video object, that is, a video corresponding to a virtual video in the AR/MR into a parent video in which the content and the scenario of the video content, and the video scene itself indefinitely and fluidly vary in real time in a natural and seamless state without discomfort.

Figure 12:
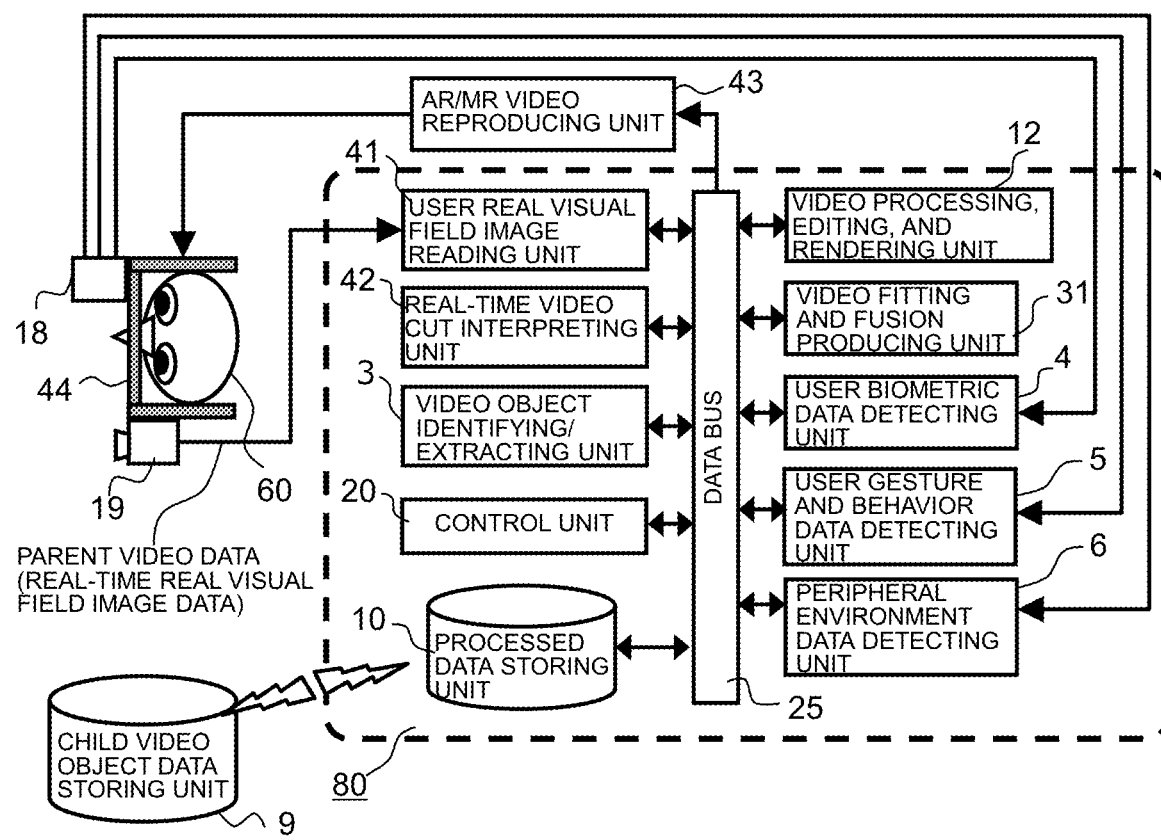
FIG. 12 is a configuration block diagram of an automatic video production device in Example 4.

FIG. 12 is a configuration block diagram of the automatic video production device in this example. Note that, in FIG. 12, the same reference numeral is given to a functional unit having a similar operation as in FIG. 1 and FIG. 10.

Note that, even in this example, as in the case of Example 3, as a preliminary preparation, video data of a virtual video to be fitted or fused into a parent video is stored as a child video object in the child video object data storing unit 9 provided in an external server. In addition, with respect to each child video object, the cast data described in the "cast data and scenario data generating process" in FIG. 2, that is, predetermined data or data group obtained by converting predetermined information on a classification, an attribute, a character, or the like of the child video object into data or a parameter is stored in the child video object data storing unit 9 in a type of being associated with the child video object.

In addition, the child video object related data is appropriately read into automatic video production device 80 in this example by a predetermined communication unit.

Note that, the external server provided with the child video object data storing unit 9 may be a dedicated server that is managed by a CM sponsor, a predetermined video content distribution company, or the like, or may be a general-purpose server such as a cloud that is connected through the Internet or the like.

In addition, an HMD 44 mounted on the head of the user 60 as an AR/MR video display device as illustrated in FIG. 12 is connected to the automatic video production device 80 in this example.

Note that, the HMD 44 includes a see-through type in which a real image viewed with eyes of a user through a transparent display is set as a real view image, and a video see-through type in which both the real view image and a virtual video that is displayed in a state of being fitted and fused into the real view image are video images, and this example is applicable to HMDs of the both types.

In addition, a sensor that detects a user's gesture or behavior such as movement of line-of-sight of the user 60, a sensor that detects biometric information of the user 60, or sensors which detect environment information such as a temperature and humidity around the user are mounted to the HMD 44. Note that, in FIG. 12, the sensors are collectively noted as a sensor 18 for convenience. In addition, all of the sensors are not necessary in this example, and the sensors may be arbitrarily selected as necessary. Of course, a sensor that detects information different from the information detected by the sensors may be added. In addition, on the contrary, the sensors may not be mounted to the HMD 44 at all.

In addition, an external world photographing camera 19 capable of photographing an external world in the same visual field region as at least in the user real view image is mounted to the HMD 44, and is connected to the automatic video production device 80 as a parent video data input device.

Note that, connection between the HMD 44, the sensor 18, and the external world photographing camera 19, and the automatic video production device 80 is not limited to a wiring connection manner as in FIG. 12, and an arbitrary connection manner such as predetermined radio communication connection capable of exchanging a predetermined data signal may be employed.

In FIG. 12, real-time video data corresponding to the user real view image captured by the external world photographing camera 19 is transmitted to the automatic video production device 80 as parent video data that becomes a fusion source through a user real visual field image reading unit 41.

The video object identifying/extracting unit 3 has a function of sequentially identifying and extracting video objects which newly appear in each video cut from real-time video data as individual video objects. Note that, since the video object identifying/extracting unit 3 has a similar function as in the functional unit indicated by the same reference number in FIG. 1 or FIG. 10, and detailed description of the function will be omitted here.

In addition, a real-time video cut interpreting unit 42 is a functional unit corresponding to the video content interpreting unit 2 in FIG. 1 or the antecedently read cut video outline interpreting unit 32 in FIG. 10, and has a function of interpreting a read parent video, that is, the content of a user's real-time real view image in a predetermined video cut unit, and converting the content into data.

Note that, when interpreting the real-time real view image, interpretation and conversion into data are performed through consideration and determination by the automatic video production device 80 on the basis of a history of information data such as an interpretation result and a scenario which are obtained up to that point of time and relate to a past video in addition to video information data of the real view image. Note that, the real-time video cut interpreting unit 42 may have a function of constructing a scenario up to a current video scene on the basis of the interpretation result, and sequentially updating existing scenario data as the latest scenario data.

On the other hand, each detection data detected by the sensor 18 is acquired to the automatic video production device 80 through a viewer biometric data detecting unit 4, the viewer gesture and behavior data detecting unit 5, the peripheral environment data detecting unit 6, and the like as necessary. Note that, the respective detecting units have a similar function as in the functional units indicated by the same reference number in FIG. 1 or FIG. 10, and thus detailed description of the function will be omitted here.

In addition, the video content data and the scenario data which are sequentially generated or updated, each piece of detection data detected and acquired from the sensor 18, and the like are appropriately stored in the processed data storing unit 10.

Note that, in FIG. 12, the processed data storing unit 10 is provided inside the automatic video production device 80, but this example is not limited to the above-described configuration. For example, the data storing units may be provided in an external server such as a cloud, and data exchange or control with the automatic video production device 80 may be performed by a predetermined communication unit or network. In addition, the processed data storing unit 10 and the child video object data storing unit 9 may be configured to share the same storage device.

Next, in the video fitting producing unit 31, similar video fitting or fusion production processing similar as in the function unit indicated by the same reference number as illustrated in FIG. 10 is performed. Note that, specific processing content of the video fitting or fusion production processing has been described in Example 1 to Example 3, and thus detailed description will be omitted here.

In addition, in even in the video processing, editing, and rendering unit 12, video processing, editing, and rendering processing is actually performed on the basis of the video fitting or fusion production result as in the functional unit indicated by the same reference numeral in FIG. 1 or FIG. 10, and thus detailed description of the function will be omitted here.

However, it is necessary for the automatic video production device 80 in this example to execute the processing in the respective functional units as described above approximately in real time. Accordingly, it may be difficult to completely execute the processing without delay depending on processing capability of the automatic video production device 80. In this case, a predetermined processing procedure, or the functional unit that is in charge of the processing may be may be partially omitted in consideration of the processing capability of the automatic video production device 80, the priority of each data or processing, and the like.

For example, with regard to the video fitting or fusion production, it is possible to employ video production in which a video processing and edition processing target is limited to the child video object side only in selection of the child video object to be fitted into the parent video, and designation of a fitting or fusion position of the target child video object in the parent video scene, and a front-back relationship or a superimposition relationship between the parent video object and the target child video object at the position. In addition, it is also possible to employ video production in which all video processing and editing procedures are omitted, only a predetermined child video object or a part thereof is superimposed on or fitted into the parent video, and the video production terminates only in designation of a screen position on which the predetermined child video object is superimposed in the parent video scene.

Note that, particularly, in the case of applying this example to the AR/MR video device by the see-through type HMD, attention is needed to be paid.

That is, in a case where the HMD 44 that displays the AR/MR video is the video see-through type, as described above, both the parent video and the child video object to be fitted or fused into the parent video are video images, and thus it is possible to freely perform video processing and edition for both the parent video and the child video object. However, in a case where the HMD 44 is a so-called see-through type, a real image that is directly viewed with eyes of the user 60 through the see-through display of the HMD 44 becomes the parent video, and thus it is difficult to process and edit the parent video. Accordingly, the video processing or edition processing for fitting or fusing a video is limited to only the child video object side. In this case, in the video fitting or fusion production, simplification or partial omission is necessary as described above.

Note that, in FIG. 12, functional units other than the above-described functional units have similar function as in the functional units indicated by the same reference numerals in FIG. 1 or FIG. 10, and thus detailed description of the functions will be omitted.

By the way, even in the above-described example, as in Example 1, it is not necessary for the automatic video production device 80 may not be configured as the functional blocks divided as illustrated in FIG. 10. For example, processing in the functional units may be collectively executed by using an information processing device such as AI.

Finally, the parent video for which the fitting or fusion processing of the child video object has been completed through the above-described processing is displayed on a predetermined display of the HMD 44 mounted on the user 60 through an AR/MR video reproducing unit 43. Note that, as a matter of course, in a case where the HMD 44 is the see-through type, only a child video object that is subjected to video fitting or fusion processing applied to a predetermined AR/MR, that is, only a virtual video is displayed on the see-through display.

Figure 13:
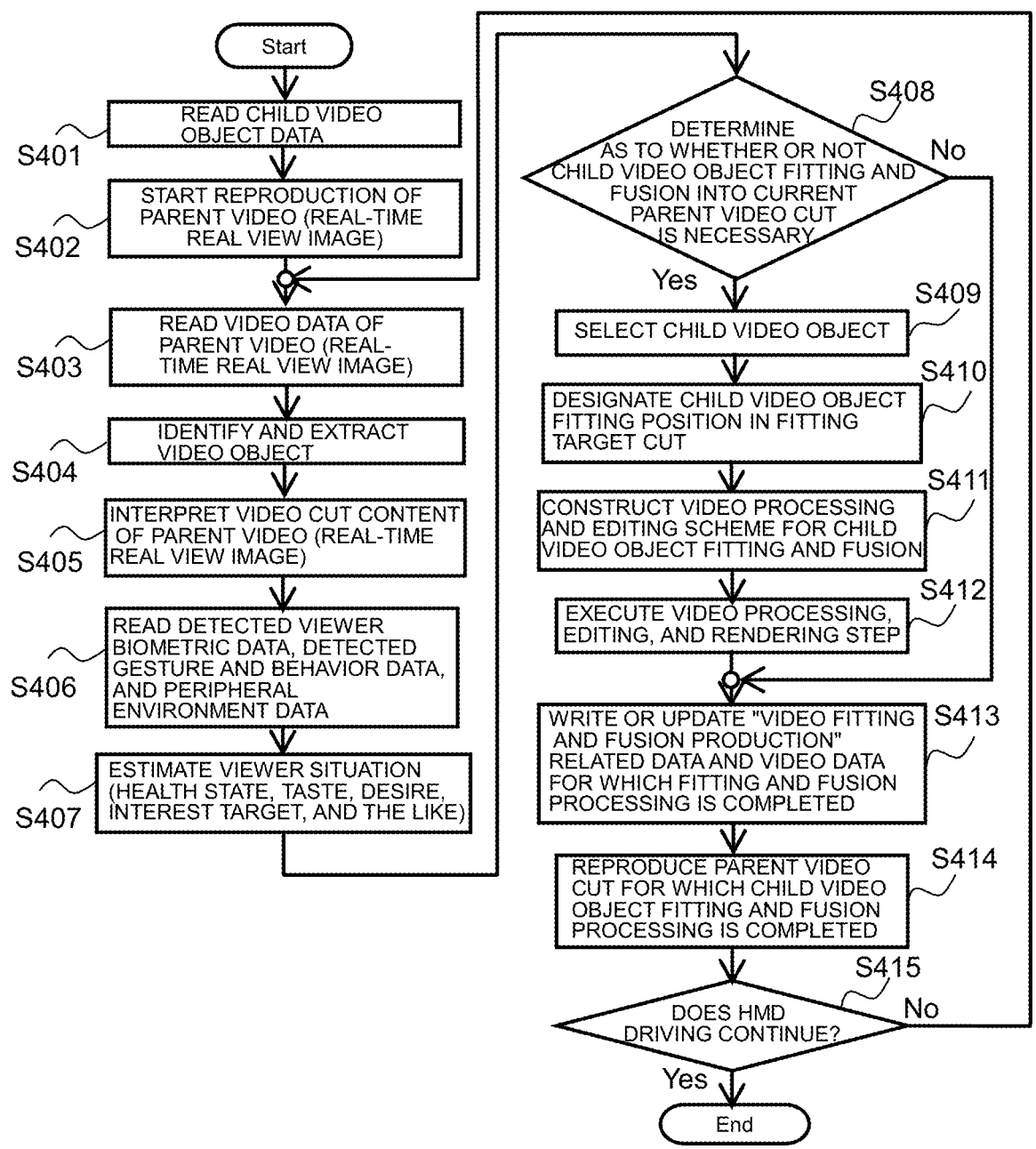
FIG. 13 is a flow chart of a processing process in Example 4.

Next, description will be given of a processing process of the automatic video production device 80 in this example. FIG. 13 is a flowchart related to the processing process in this example. The processing process in this example is basically executed by a processing flow similar to the processing flow in the processing process described in FIG. 10.

In FIG. 13, first, in S401, the automatic video production device 80 reads child video object data, that is, video data of the child video object and cast data associated with the child video object from a predetermined data storing unit.

Next, in S402, when reproduction of the parent video, that is, the real-time real view image starts (corresponding to initiation of actual view with user's eye in the case of the see-through type HMD), the automatic video production device 80 reads video data of the parent video (real-time real view image) obtained by the external world photographing camera 19 in subsequent S403.

In addition, in subsequent S404, targets such as a person and an object which newly appear in a current parent video scene are identified and extracted as individual parent video objects, and a predetermined object identifier such as an object name and an ID number for distinguishing the extracted parent video objects and the child video object from other video objects is applied to the extracted parent video objects and the child video object.

In addition, in subsequent S405, the parent video, that is, the video content of the real-time real view image is interpreted and converted into data on the basis of an information history of the kind, arrangement position, and movement of the parent video objects identified and extracted in S404, and an interpretation result and scenario data which are obtained up to that point of time and relate to a past video.

In addition, in subsequent 3406, similar processing as in S306 in FIG. 11 is performed, and predetermined detection data is obtained. In addition, in subsequent S407, similarly, similar processing as in S307 of FIG. 11 is performed, and a predetermined viewer situation is estimated. Note that, as a matter of course, 3406 and 3407 may be skipped as necessary as in the case of respective examples, and the processing steps may be omitted.

In addition, in subsequent S408, it is determined whether or not to perform fitting or fusion of the child video object into a current parent video cut, that is, the user real view image. In a case where it is determined as "Yes", the process proceeds to processing from S409 to be described later. On the other hand, in the case of "No", from S409 to S412 to be described later are skipped, and the process proceeds to 3413.

In addition, in subsequent S409, a child video object to be fitted into the parent video cut is selected among a plurality of child video objects. In addition, in subsequent S410, a screen position into which the target child video object is fitted is designated in the parent video cut.

In addition, in subsequent S411, in order to very naturally and seamlessly fit the target child video object into the designated screen position in the target parent video cut without discomfort, a "video processing and editing scheme" that clearly indicates a content and a procedure of specific video processing and edition that is carried out on the child video object or the parent video cut is constructed. Hereinafter, a series of processing from S409 to S411 is noted as "video fitting and fusing production" processing.

Next, in S412, video processing, editing, and rendering processing is actually executed on the basis of the "video processing and editing scheme". As described in Examples 1 to 3, the processing is executed by using a predetermined digital image processing technology such as a computer graphic technology, a 3D morphing technology, and a shading technology.

However, in this example, it is necessary to execute the "video fitting and fusion production" processing process and the video processing, editing, and rendering processing process approximately in real time. Accordingly, it may be difficult to completely execute the processing processes without delay depending on processing capability of the automatic video production device 80. In this case, as described above, a part may be simplified or a part may be omitted in consideration of the processing capability of the automatic video production device 80, the priority of each data or processing step, and the like.

In addition, in subsequent S413, the following processing is performed as necessary. Specifically, processing results obtained in the respective processing steps, that is, a selection result of the parent video cut that becomes the child video fitting or fusion target or the child video object to be fitted or fused into the parent video cut, a designation result of the fitting or fusion screen position in the parent video cut, or various types of data related to the "video processing and editing scheme", the parent video data for which the child video object, that is, the virtual video fitting and fusion processing is completed, and the like are written in a predetermined data storing unit or updated as necessary.

In addition, in subsequent S414, the parent video for which the virtual video fitting or fusion processing is completed, that is, the real-time real view image is reproduced. Note that, in S413 and S414, a processing procedure thereof may be changed, or both processing steps may be simultaneously performed.

In addition, in final S415, it is determined whether or not to terminate the child video object fitting or fusion processing with respect to the parent video, that is, the AR/MR virtual video display by the HMD or the like. In a case where it is determined as "No", the process returns to S403, and a series of processing flow is repeated. On the other hand, in the case of "Yes", the series of processing processes are terminated.

As described above, in this example, it is possible to realize the AR/MR video device capable of performing fitting or fusion displaying of a predetermined virtual video into a user's real view image in a natural and seamless state without discomfort.

Note that, in the case of using the automatic video production device as in this example for the CM video incorporation into an AR/MR display screen or the like, as in Examples 1 to 3, it is possible to combine a mechanism of counting the number of times of fitting or fusion displaying of a target CM video into the parent video, time taken for the fitting or fusion displaying, or the like, and giving a restriction on CM provision or charging a CM sponsor side a predetermined CM fee in correspondence with the count result, or the like.

Figure 14:
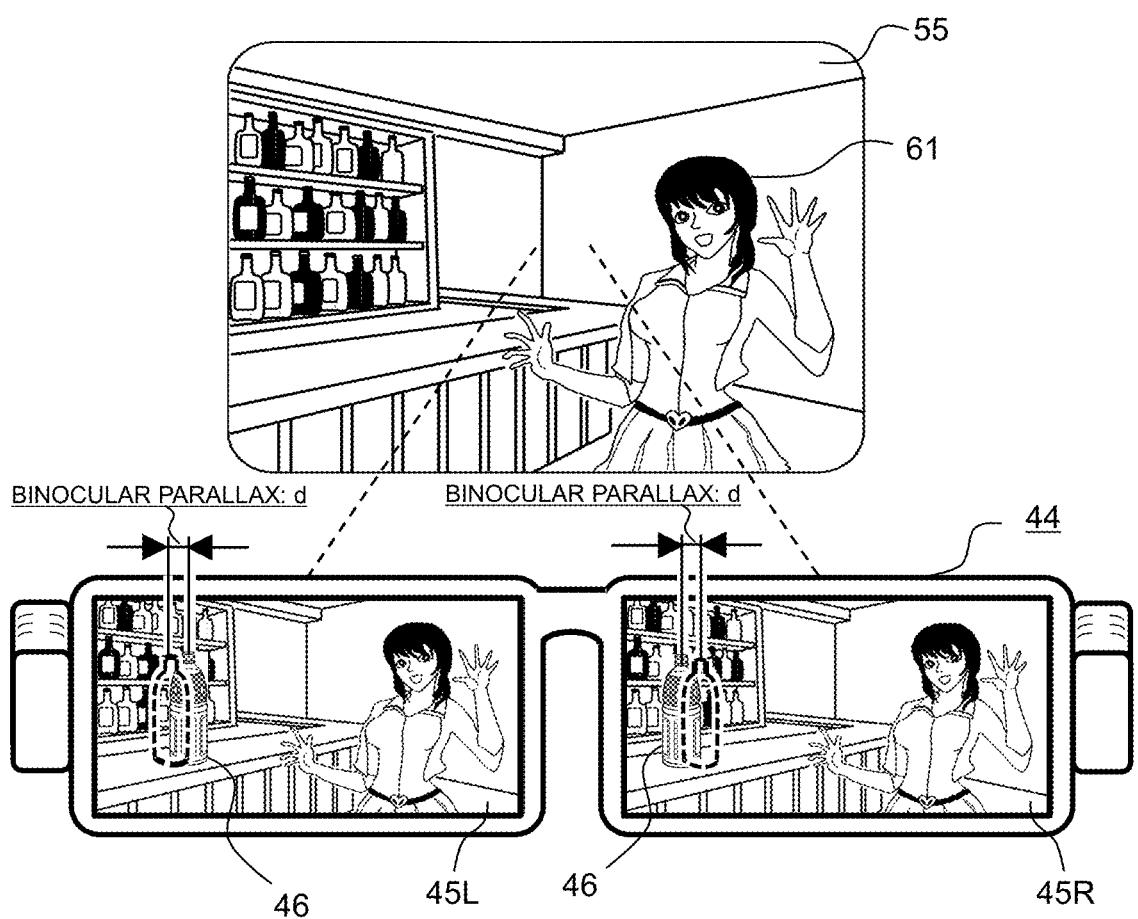
FIG. 14 is a schematic view illustrating one practical case of AR display by an eyeglass-type HMD in Example 4.

FIG. 14 illustrates one practical case of the AR video device by the HMD using the automatic video production device in this example.

In FIG. 14, a reference numeral 55 indicates one scene of a demonstration site in which a person 61 (for example, the idol (A)) is dancing on a special stage with a bar counter set aside, and indicates a real world. In addition, a reference numeral 44 indicates a schematic external view of an eyeglass-type HMD worn by a user from the user side, and the user is viewing a dance demonstration scene (three-dimensional scene) of the idol (A) 61 with eyes through a see-through display 45L for the left eye and a see-through display 45L for the right eye.

FIG. 14 shows a practical case where the automatic video production device of this example displays, for example, a predetermined soft drink PET bottle as a CM video by AR superimposition in the above-described situation.

First, in the situation, as video fusion production capable of expecting a constant CM appealing effect without discomfort, the automatic video production device determines video production in which a virtual video of the PET bottle is displayed by the AR superimposition so that the PET bottle 46 as a CM target is set on the bar counter aside the idol (A) 61.

Next, the automatic video production device determines a three-dimensional position at which the target PET bottle is to be disposed in the real world 55, and obtains a video display position of the PET bottle 46 which corresponds to the three-dimensional position on each of the see-through displays 45L and 45R through arithmetic operation.

That is, a depth distance between the PET bottle 46 and a user is calculated from the three-dimensional position where the target PET bottle 46 is virtually placed in the real world 55, and binocular parallax d in which the user recognizes the depth distance. Videos of the PET bottle 46 which are displaced by the binocular parallax d are displayed on the see-through display 45L for the left eye and the see-through display 45R for the right eye by AR superimposition.

As described above, when the videos of the PET bottle 46 to which the predetermined binocular parallax d is applied are displayed on the left and right see-through displays of the HMD by AR superimposition, it is possible to allow the user to recognize that the soft drink PET bottle as a CM target is placed on the counter aside the idol (A) in the real world 55.

In addition, it is possible to display a video with more reality by AR/MR by obtaining a direction and a shape of a shadow of the PET bottle projected onto the bar counter from an incident direction of illumination light or the like in the real world 55 with a predetermined arithmetic operation unit, and by performing more advanced video fusion production such as displaying of the shadow in a superimposed manner by a predetermined shading technology.

As described above, according to this example, it is possible to provide an AR/MR compatible automatic video production device suitable.

Example 5

In Example 4, a real-time real view image in the AR/MR video device such as the HMD, or the like is set as the parent video that becomes a fitting or fusion source of a virtual video. Accordingly, it is necessary to execute a series of processing processes such as the "video fitting and fusion production" processing related to fitting or fusion of the child video object to be a virtual video, the video processing, editing, and rendering processing, and reproduction and displaying of a processed video in approximately in real time. However, a certain time lag according to execution of the series of processing processes is apt to occur between the moment when a user visually recognizes the real view image and displaying of the virtual video that is fitted into the real view image through the series of processing processes. Accordingly, in the AR/MR video device such as the HMD, for example, when performing rational and advanced video fusion production without discomfort as introduced in FIG. 7, depending on processing capability of the automatic video production device, there is a possibility that execution of processing may be difficult due to a minute time lag to a certain extent that can be felt by a user approximately in real time.

In this example, description will be given of an example of an AR/MR compatible automatic video production device capable of performing the advanced video fitting or fusion processing.

Figure 15:
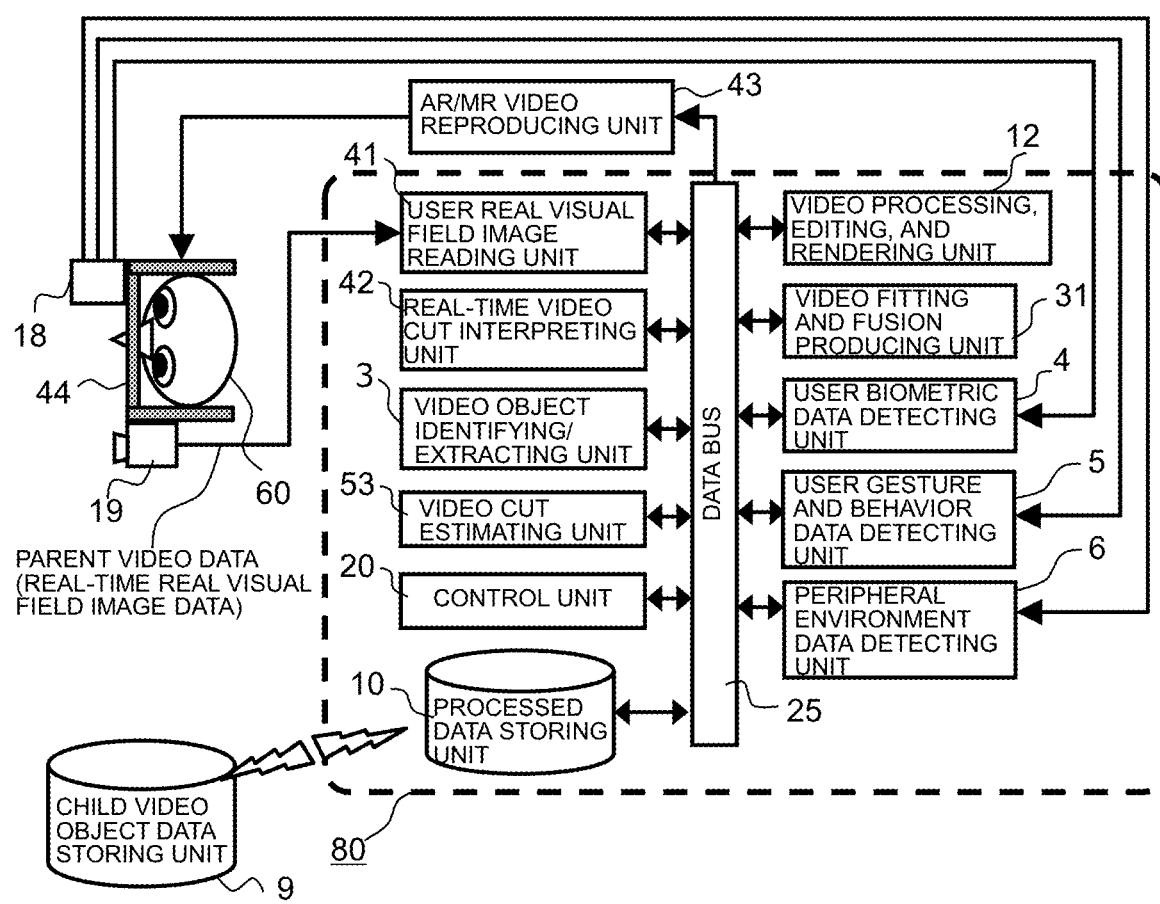
FIG. 15 is a configuration block diagram of an automatic video production device in Example 5.

FIG. 15 is a configuration block diagram of an automatic video production device in this example. Note that, in FIG. 15, the same reference numeral is given to a function unit that has a similar operation as in FIG. 1 or FIG. 12.

An automatic video production device 80 in this example has approximately the same functional unit configuration as in FIG. 12. A difference from FIG. 12 is in that a video cut estimating unit 53 is newly added. Accordingly, detailed description on respective functional unit other than the video cut estimating unit 53 will be omitted.

In addition, an external world photographing camera 19 mounted on the automatic video production device 80 in this example has a function of photographing the external world at a wider visual field including a real visual field of a user 60, and a function of defining (framing) an actual-visual-recognition visual field of the user 60 in a captured visual field.

In FIG. 15, real-time external world video data captured by the external world photographing camera 19 is read into the automatic video production device 80 as parent video data.

The video cut estimating unit 53 has a function of estimating a parent video cut within a predetermined time from the current point of time, for example, up to the future from several seconds to several tens of seconds from the current point of time, that is, a future visual recognition video cut that is considered to be actually visually recognized by the user 60 from the current point of time up to passage of predetermined time on the basis of the parent video data, the video content information of the parent video and the latest scenario information at that point of time which are interpreted from the parent video data by the real-time video cut interpreting unit 42, detection data related to a user's gesture and behavior such as line-of-sight movement of the user 60, and the like.

Note that, at this time, the real-time external video captured by the external world photographing camera 19 is set to a wider visual field video including the actual-visual-recognition visual field of the user 60, and this configuration is effective for estimating a future visual recognition video based on a history of line-of-sight movement of the user 60 or the like.

In addition, the estimated future visual recognition video is updated into an estimation video that can be determined as the most correct video always at that point of time on the basis of the parent video content information and scenario information sequentially updated to the latest information which are interpreted up to that point of time in the real-time video cut interpreting unit 42.

In this example, the "video fitting and fusion production" processing process and the video processing, editing, and rendering processing process based on the "video fitting and fusion production" result as described in Example 4 are carried out with regard to antecedent parent video cut estimated as described above, that is, the future visual recognition video prior to a current parent video, that is, a current real view image.

That is, in this example, the series of video fusion processing processes can be executed with sufficient time margin by the preceding processing with respect to the estimated future visual recognition video, advanced video fusion processing can be realized even in the AR/MR video device.

Note that, even in this example as above-described, as in Example 1, the automatic video production device 80 may not be configured as the functional blocks divided as illustrated in FIG. 15. For example, processing in the functional units may be collectively executed by using a predetermined information processing device such as AI.

Figure 16:
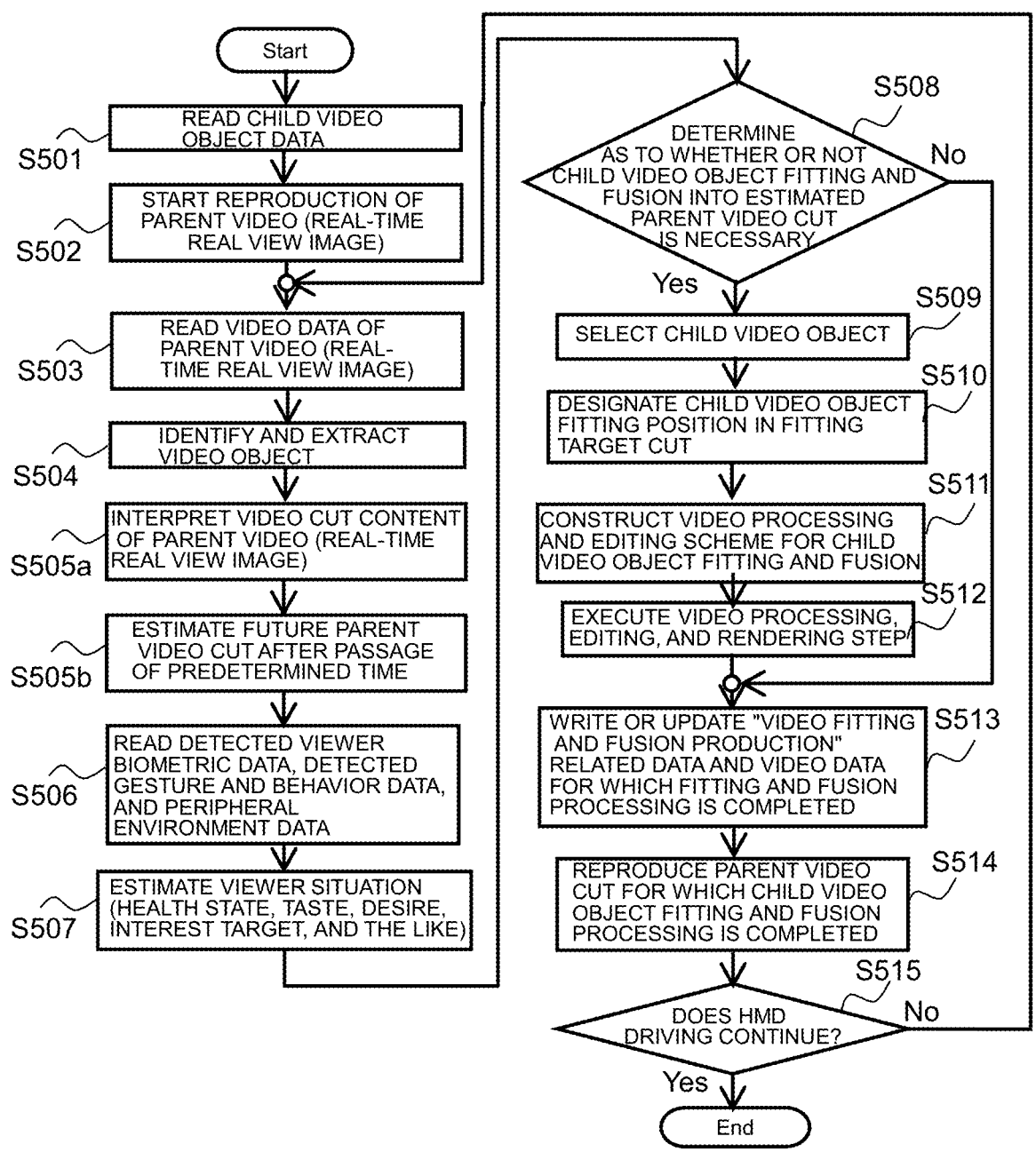
FIG. 16 is a flow chart of a processing process in Example 5.

Next, description will be given of a processing process of the automatic video production device 80 in this example. FIG. 16 is a flowchart of the processing process in this example.

In FIG. 16, S501 to S505a are completely the same processing contents as in S401 to S405 described in FIG. 13, and thus detailed description will be omitted here. In addition, similarly, subsequent S506 and S507 are completely the same processing contents as in S406 and S407 described in FIG. 13, and thus detailed description thereof will be omitted here.

A characteristic of this example is in that a parent video cut within a predetermined time from the current point of time, for example, up to the future from several seconds to several tens of seconds from the current point of time, that is, a future real visual recognition video cut that is considered to be actually visually recognized by the user 60 from the current point of time up to passage of predetermined time is estimated in S505b. In addition, in a case where a parent video side video object that is estimated to newly appear in the future real visual recognition video cut, a predetermined identifier is given to the estimated parent video object as necessary. Note that, S505b, S506, and S507, a processing procedure may be changed.

In addition, in S508, it is determined whether or not to carry out child video object fitting or fusion with respect to the parent video scene. In a case where it is determined as "Yes", the process proceeds processing from S509 to be described later. On the other hand, in the case of "No", S509 to S512 to be described later are skipped, and the process proceeds to S513.

Note that, the respective processing contents from S509 to 3512 are completely the same as the respective processing contents from S409 to S412 described in FIG. 13, and thus detailed description thereof will be omitted here.

In addition, in subsequent 3513, processing of sequentially adding the parent video data for which the fitting or fusion processing of the child video object, that is, the virtual video has been completed in a predetermined data storing unit is performed. In addition, processing results obtained in the respective processing steps, that is, a selection result of the parent video cut that becomes the child video fitting or fusion target or the child video object to be fitted or fused into the parent video cut, a designation result of the fitting or fusion screen position in the parent video cut, various types of data related to the "video processing and editing scheme", and the like may be written to the data storing unit or updated as necessary.

In addition, in S514, in conformity to passage of time, the parent video, for which fitting or fusion processing of the child video object to be reproduced at the time, that is, a predetermined virtual video has been completed, is reproduced.

In addition, in final S515, it is determined whether or not to terminate the series of child video object fitting or fusion processing process with respect to the parent video, that is, displaying of the virtual video in the AR/MR. In a case where, it is determined as "No", the process returns to S503, and the series of processing processes are repeated. On the other hand, in the case of "Yes", the series of processing processes are terminated.

By the way, in description related to this example up to now, description has been given of an example in which the respective processing steps in FIG. 16 are sequentially executed in accordance with the flowchart for convenience of explanation. However, in this example, actually, a plurality of processing processes including several processing steps are independently and simultaneously executed in parallel.

For example, the further parent video cut estimating process from S503 to S507, the "video fitting and fusion production" process from S508 to S512, and the video processing, editing, and rendering processing process based on the "video fitting and fusion production result" are simultaneously executed in parallel.

That is, the automatic video production device 80 simultaneously executes the "video fitting and fusion production" process using an estimated future parent video and the video processing, editing, and rendering processing process based on the production result while sequentially estimating the latest future parent video from a user's real visual recognition video.

In addition, with regard to reproduction of the parent video in S514, since the parent video is a video corresponding to a real-time real view image at that point of time, actually, reproduction of the parent video in S514, and the series of processing processes from S503 to S513 are executed in parallel.

That is, in this example, while reproducing the real-time real view image that is the parent video (in the case of the video see-through type HMD) and while viewing a real image with eyes (in the case of the see-through type HMD), processing of fitting or fusing a predetermined child video object, that is, a virtual video is simultaneously performed with respect to an estimated further visual recognition video that is antecedent by a predetermined time in parallel. Due to the simultaneous processing performed in parallel, even in a case where a real-time real visual field image is set as the parent video that becomes a video fitting or fusion source as in the AR/MR video device, natural virtual video fusion without discomfort due to advanced video fusion can be performed.

Note that, in the case of using the automatic video production device as in this example for CM video incorporation into the AR/MR display screen or the like, as in Examples 1 to 4, it is possible to combine a mechanism of counting the number of times of fitting or fusion displaying of a target CM video into the parent video content, time taken for the fitting or fusion displaying, or the like, and giving a restriction on CM provision or charging a CM sponsor side a predetermined CM fee in correspondence with the count result, or the like.

As described above, according to this example, it is possible to provide an AR/MR compatible automatic video production device capable of performing advanced video fitting or fusion processing.

Example 6

In this example, description will be given of a CM video automatic broadcasting service system as one practical case of a service using the automatic video production device described in Examples 1 to 5.

Figure 17:
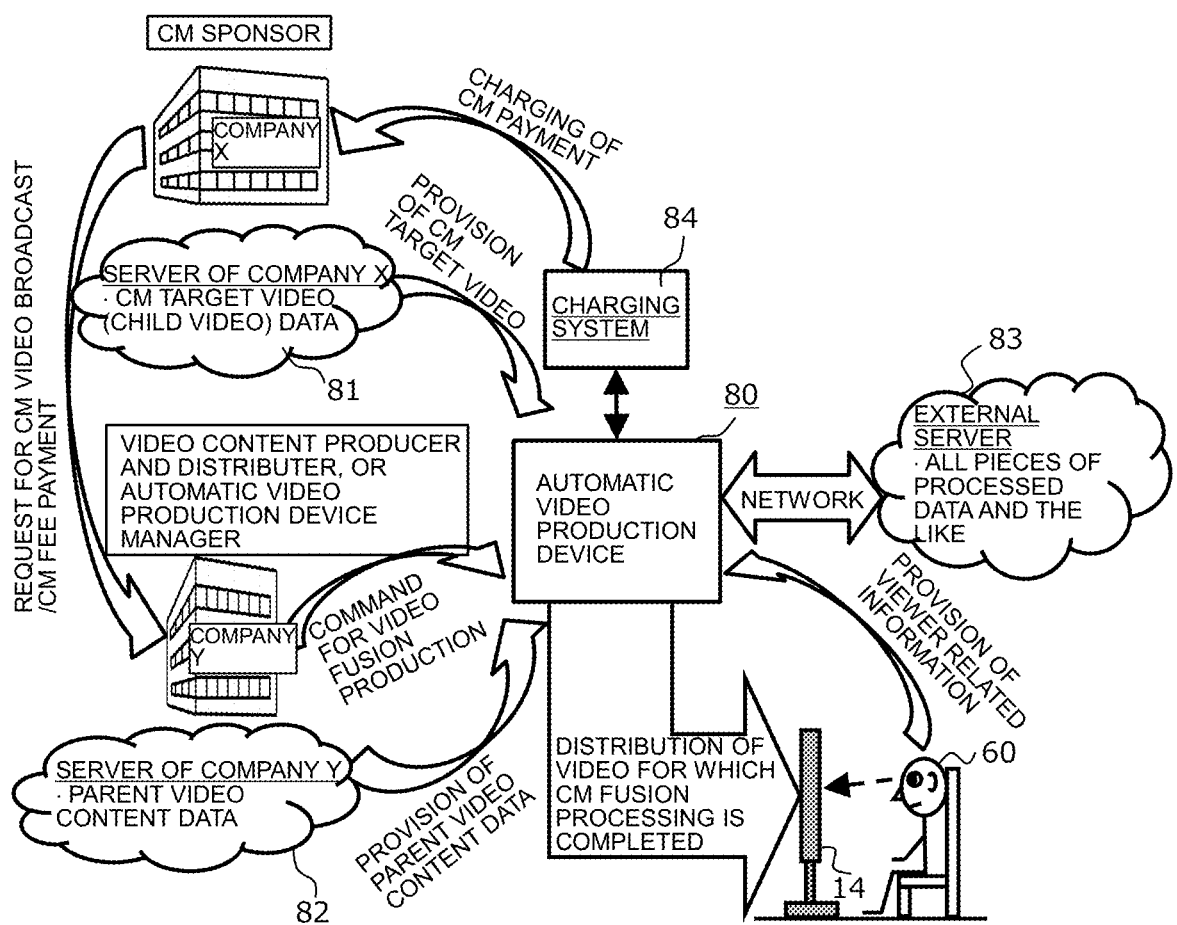
FIG. 17 is a conceptual diagram of a CM video fusion service system using an automatic video production device in Example 6.

FIG. 17 is a conceptual diagram of a CM video fusion service system using the automatic video production device in this example. In FIG. 17, first, when a CM sponsor (for example, a predetermined product maker) (Company X) makes a request for a video content producer and distributor who manages the automatic video production device 80 or a manager of the automatic video production device 80 (Company Y) to perform CM video broadcasting with respect to a predetermined video content, in accordance with the request, Company Y gives a video fusion production command to the automatic video production device 80 that is managed by Company Y.

When receiving the video fusion production command, the automatic video production device 80 reads video data of a target parent video content from a server 82 of Company Y or an external server 83 such as a cloud that is connected through a predetermined communication unit or network.

Note that, the parent video content may be a produced typical video content available from a predetermined server as described above, or a user's real visual recognition video obtained through the HMD illustrated in Example 4 or Example 5, or the like.

On the other hand, the automatic video production device 80 receives video data of the CM target as a child video object from a server 81 of Company X that is the CM sponsor, or the external server 83 such as the cloud that is connected to through a predetermined communication unit or network.

In addition, CM fusion production processing is executed through the above-described processing processes as illustrated in respective examples by using the parent video, the child video, a predetermined viewer related information provided from a viewer, and the like, and the parent video for which the CM fusion processing has been completed is distributed, and is broadcasted toward the viewer 60 through a predetermined display device 14.

On the other hand, a predetermined billing system 84 is connected to the automatic video production device 80, and the number of times of fitting or fusion displaying of the target CM video into the parent video content, time taken for the fitting or fusion displaying, or the like is counted by the billing system. In correspondence with the count result, a restriction is given on CM provision or Company X that is the CM sponsor is charged with a predetermined CM fee.

In a case where the CM video automatic providing service system is constructed, it is possible to obtain a CM compatible video content viewing environment that is optimal to both the sponsor side and the user side with almost no human labor.

Hereinbefore, description has been given of examples, but the invention is not limited to the above-described examples, and includes various modification examples. For example, the examples have been described in detail for easy understanding of the invention, and it is not limited to a case where all of the configurations are included. In addition, a configuration of another example may be added to a configuration of an arbitrary example. In addition, with respect to parts of the respective examples, addition, deletion, and substitution of another configuration may be performed.

REFERENCE SIGNS LIST

1 Video content data reading unit
2 Video content interpreting unit
3 Video object identifying/extracting unit
4 Viewer biometric data detecting unit
5 Viewer gesture and behavior data detecting unit
6 Peripheral environment data detecting unit
7 Cast data generating unit
8 Scenario data generating unit
9 Child (fusing target) video object data storing unit
10 Processed data storing unit
11 Video fusion producing unit
12 Video processing, editing, and rendering unit
20 Control unit
31 Video fitting producing unit
32 Antecedently read cut video outline interpreting unit
53 Video cut estimating unit
80 Automatic video production device
44 Head-mounted display (abbreviated name HMD)
60 Viewer or user

The invention claimed is:

1. An automatic video production device that performs fitting or fusion processing of a predetermined child video object that is not included in a parent video into a predetermined video of the parent video as a video fusion source, the automatic video production device comprising processing circuitry configured to:
   interpret a video content in a first video in the parent video,
   estimate a video content of a second video to be broadcasted after passage of a predetermined time from the first video on the basis of the interpretation result for the first video, and
   generate processing data on the basis of the estimation result.

2. The automatic video production device according to claim 1, the processing circuitry further configured to:
   identify and extract a predetermined parent video object appearing in the parent video and the child video object on the basis of the processing data, and
   apply a predetermined object identifier to the parent video object and the child video object.

3. The automatic video production device according to claim 2, the processing circuitry further configured to:
   generate processing data that is predetermined cast data obtained by converting predetermined information into data or a parameter in a predetermined description format with respect to the identified and extracted video objects, the predetermined information relating to,
   a physical attribute item that defines physical classification, attribute, or characteristic of the video objects from a predetermined viewpoint,
   a social attribute item that defines social classification, attribute, or characteristic of the video objects from a predetermined viewpoint,
   an item that clearly indicates classification or a characteristic of visible appearance of the video objects,
   an item that clearly indicates classification or a characteristic of invisible state of the video objects, or
   an item that clearly indicates a mutual relationship or connectivity between the video objects.

4. The automatic video production device according to claim 2, the processing circuitry further configured to:
   generate processing data that is scenario data obtained by converting predetermined information into data or a parameter in a predetermined description format with respect to a predetermined parent video object appearing in a predetermined parent video scene in the parent video among the identified and extracted parent video objects, or the child video object, the predetermined information relating to,
   an item related to a three-dimensional position in the parent video scene of the parent video object,
   an item related to a direction or a posture in the three-dimensional direction of the parent video object,
   an item related to a dialogue or facial expression, a gesture, and a behavior of the parent video object,
   a predetermined restriction condition applied to the parent video object or the child video object, or
   a restriction condition that includes designation of a video region for which fitting or fusion of the child video object is permitted in the predetermined parent video, and is applied to the entirety of the predetermined parent video.

5. The automatic video production device according to claim 1, wherein the processing circuitry is further configured to add the processing data to a predetermined position of video data stream of the parent video or video data of the child video object.

6. The automatic video production device according to claim 1,
wherein the processing circuitry is further configured to:
detect information on a biometric situation, a gesture, a motion, or a behavior of a viewer or user, or information on a peripheral environment situation of the viewer including a season, a date, a location, a temperature, or humidity, and
estimate a physiological state or a psychological state of the viewer or user on the basis of the pieces of detected information or select a child video object that is to be presented to the viewer or user among a plurality of the child video objects on the basis of the estimation result or the pieces of detected information.

7. The automatic video production device according to claim 1, the processing circuitry further configured to:
determine a video for which fitting or fusion processing of the child video object is performed in the parent video on the basis of the processing data, a screen position where fitting or fusion processing of the child video object is performed in the video scene, or a content and a procedure of video processing and edition processing that is performed with respect to the predetermined parent video object or the child video object in order to execute the fitting or fusion processing while retaining rationality of the video content or a content image, and
generate a video fusion production scheme obtained by converting the determination results into data in a predetermined description format.

8. The automatic video production device according to claim 7, the processing circuitry further configured to:
realize fitting or fusion of the child video object into the parent video by executing the video fusion production scheme by using predetermined computer graphics or rendering function.

9. A non-transitory video recording medium in which recording is performed by the automatic video production device according to claim 5,
wherein a video data stream of the parent video to which the processing data is added or video data of the child video object is recorded in the non-transitory video recording medium.

10. The automatic video production device according to claim 1, further comprising:
a video display device of a virtual reality video, an Augmented Reality video, or Mixed Reality video.

11. An automatic video production method that performs fitting or fusion processing of a predetermined child video object that is not included in a parent video into a predetermined video scene of the parent video as a video fusion source, the automatic video production method comprising:
interpreting a video content in a first video in the parent video,
estimating a video content of a second video to be broadcasted after passage of predetermined time from the first video on the basis of the interpretation result for the first video in the parent video, and
generating processing data that on the basis of the estimation result.

12. The automatic video production method according to claim 11, further comprising:
identifying and extracting a predetermined parent video object appearing in the parent video and the child video object on the basis of the processing data, and
applying a predetermined object identifier to the parent video object and the child video object.

13. The automatic video production method according to claim 12, further comprising:
generating processing data that is predetermined cast data obtained by converting predetermined information into data or a parameter in a predetermined description format with respect to the identified and extracted video objects, the predetermined information relating to:
a physical attribute item that defines physical classification, attribute, or characteristic of the video objects from a predetermined viewpoint,
a social attribute item that defines social classification, attribute, or characteristic of the video objects from a predetermined viewpoint,
an item that clearly indicates classification or a characteristic of visible appearance of the video objects,
an item that clearly indicates classification or a characteristic of invisible state of the video objects, or
an item that clearly indicates a mutual relationship or connectivity between the video objects.

14. The automatic video production method according to claim 12, further comprising:
generating processing data that is scenario data obtained by converting predetermined information into data or a parameter in a predetermined description format with respect to a predetermined parent video object appearing in a predetermined parent video scene in the parent video among the identified and extracted parent video objects, or the child video object, the predetermined information relating to:
an item related to a three-dimensional position in the parent video scene of the parent video object,
an item related to a direction or a posture in the three-dimensional direction of the parent video object,
an item related to a dialogue or facial expression, a gesture, and a behavior of the parent video object,
a predetermined restriction condition applied to the parent video object or the child video object, or
a restriction condition that includes designation of a video region for which fitting or fusion of the child video object is permitted in the predetermined parent video, and is applied to the entirety of the predetermined parent video.

15. The automatic video production method according to claim 11, further comprising adding the processing data to a predetermined position of video data stream of the parent video or video data of the child video object.

16. The automatic video production method according to claim 11, further comprising:
detecting information on a biometric situation, a gesture, a motion, or a behavior of a viewer or user, or information on a peripheral environment situation of the viewer including a season, a date, a location, a temperature, or humidity, and
estimating a physiological state or a psychological state of the viewer or user on the basis of the pieces of detected information or select a child video object that is to be presented to the viewer or user among a plurality of the child video objects on the basis of the estimation result or the pieces of detected information.

17. The automatic video production method according to claim 11, further comprising:

determining a video scene for which fitting or fusion processing of the child video object is performed in the parent video on the basis of the processing data, a screen position where fitting or fusion processing of the child video object is performed in the video scene, or a content and a procedure of video processing and edition processing that is performed with respect to the predetermined parent video object or the child video object in order to execute the fitting or fusion processing while retaining rationality of the video content or a content image, and generating a video fusion production scheme obtained by converting the determination results into data in a predetermined description format.

18. The automatic video production method according to claim 17, further comprising realizing fitting or fusion of the child video object into the parent video by executing the video fusion production scheme by using predetermined computer graphics or rendering function.

* * * * *